US007622174B2

(12) United States Patent
Pearson et al.

(10) Patent No.: US 7,622,174 B2
(45) Date of Patent: Nov. 24, 2009

(54) TAPE SHEET PADS AND DISPENSER AND METHOD OF DISPENSING INDIVIDUAL TAPE SHEETS FROM SUCH PADS

(75) Inventors: Scott D. Pearson, Woodbury, MN (US); David F. Serino, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1799 days.

(21) Appl. No.: 09/999,698

(22) Filed: Oct. 26, 2001

(65) Prior Publication Data

US 2003/0082327 A1 May 1, 2003

(51) Int. Cl.
*B32B 9/00* (2006.01)
*B32B 33/00* (2006.01)

(52) U.S. Cl. ..................... 428/40.1; 428/41.8; 428/42.1

(58) Field of Classification Search ................ 428/40.1, 428/41.7, 194, 195, 68, 201, 212, 220, 41.8, 428/42.1
See application file for complete search history.

(56) References Cited

U.S. PATENT DOCUMENTS

| | | | | |
|---|---|---|---|---|
| D116,599 | S | 9/1939 | Reinecke | |
| 2,532,011 | A | 11/1950 | Dahlquist et al. | 154/53.5 |
| 2,607,711 | A | 8/1952 | Hendricks | 117/122 |
| 2,926,105 | A | 2/1960 | Steinhauser | 117/76 |
| 2,927,868 | A | 3/1960 | Revoir | 117/76 |
| 3,331,729 | A | 7/1967 | Danielson et al. | 161/162 |
| 3,578,622 | A | 5/1971 | Brown et al. | 260/33.8 |
| 3,691,140 | A | 9/1972 | Silver | 260/78.5 |
| 4,107,811 | A * | 8/1978 | Imsande | 15/215 |
| 4,279,717 | A | 7/1981 | Eckberg et al. | 204/159.13 |
| 4,313,900 | A | 2/1982 | Gonzales et al. | 264/61 |
| 4,416,392 | A | 11/1983 | Smith | 221/45 |
| 4,421,904 | A | 12/1983 | Eckberg et al. | 528/27 |
| 4,562,938 | A | 1/1986 | Loder | 221/46 |
| 4,586,629 | A | 5/1986 | Loder | 221/46 |
| 4,650,706 | A | 3/1987 | Emmel | 428/40 |
| 4,653,666 | A | 3/1987 | Mertens | 221/45 |
| 4,699,842 | A | 10/1987 | Jorgensen et al. | 428/343 |
| 4,770,320 | A | 9/1988 | Miles et al. | 221/33 |
| 4,835,217 | A | 5/1989 | Jorgensen et al. | 525/93 |
| 4,895,746 | A | 1/1990 | Mertens | 428/40 |
| 4,928,864 | A | 5/1990 | Walker et al. | 224/162 |
| 5,401,547 | A | 3/1995 | Blackwell et al. | 428/40 |
| 6,461,709 | B1 * | 10/2002 | Janssen et al. | 428/41.7 |
| 2003/0129346 | A1 * | 7/2003 | Pearson et al. | 428/40.1 |

FOREIGN PATENT DOCUMENTS

| | | |
|---|---|---|
| EP | 1 044 825 A1 | 10/2000 |
| WO | WO00/29224 | 5/2000 |

* cited by examiner

*Primary Examiner*—Patricia L Nordmeyer
(74) *Attorney, Agent, or Firm*—Trisha D. Adamson

(57) ABSTRACT

A stacked pad of large adhesive tape sheets containing a plurality of superimposed tape sheets formed from a substrate with an area of differential release, which extends less than the full length and width of the substrate. The second major surface of the substrate includes a layer of an adhesive. Sequential tape sheets in the pad are configured and arranged with the area of differential release alternating between first and second corners of the sheets with the adhesive layer of each tape sheet is releasably adhered to an adjacent tape sheet at a higher adhesion level, except for the area of differential release which adheres to an adjacent tape sheet at a lower adhesion level.

20 Claims, 12 Drawing Sheets

TAPE SHEET PADS AND DISPENSER AND METHOD OF DISPENSING INDIVIDUAL TAPE SHEETS FROM SUCH PADS

FIELD OF THE INVENTION

The invention broadly relates to (i) pads of pressure sensitive adhesive tape sheets, (ii) dispensers for tape sheet pads, and (iii) methods of dispensing individual tape sheets from tape sheet pads.

BACKGROUND OF THE INVENTION

Numerous types of pressure sensitive adhesive tapes capable of connecting or joining two surfaces (e.g., adhering a sheet of paper onto a tabletop) are well known. For example, #810 Scotch™ Magic™ brand transparent tape, manufactured by Minnesota Mining and Manufacturing Company, St. Paul, Minn. is readily available from numerous retail outlets. Such pressure sensitive adhesive tapes, including #810 Scotch™ Magic™ brand transparent tape, are generally available as a continuous roll of tape capable of being conveniently dispensed from any of a number of manually-operated roll-type tape dispensers, such as those disclosed in U.S. Pat. No. 4,928,864 and D116,599, having a cutting edge located on the dispenser for cutting the tape into strips of the desired length. While effective for quickly and efficiently dispensing most pressure sensitive adhesive tapes, it is difficult to create tape strips of uniform length due to the natural variations in the length of tape unwound from the roll of adhesive tape between cuttings. Hence, such dispensers are not suitable for those situations requiring the quick and efficient dispensing of uniform lengths of pressure sensitive adhesive tape.

It is also known to dispense pressure sensitive adhesive tape, such as Scotch™ Magic™ brand transparent tape, from a stacked pad of tape strips. Such pads of adhesive tape strips are disclosed in U.S. Pat. Nos. 4,650,706 and 4,895,746. Both patents disclose stacked pads of adhesive tape strips wherein a first end portion of each individual strip is treated so as to provide a nonadhesive end tab ('706) or an area of reduced adhesion to an adjacent tape strip ('746) at a first end of the pad. The nonadhesive end tab or area of reduced adhesion facilitates initial separation of the first end of an uppermost tape strip from the first end of an immediately underlying tape strip, allowing the uppermost tape strip to be peeled off the pad. While generally effective for dispensing uniform lengths of pressure sensitive adhesive tape, such pads are somewhat cumbersome to use and are not well suited for use in those situations where only one hand is available for dispensing the tape, such as gift wrapping.

Post-it® brand notes and Post-it® brand flags, available from Minnesota Mining and Manufacturing Company of St. Paul, Minn., require a coating of releasable pressure sensitive adhesive only along one end of the substrate, and can therefore be conveniently dispensed from a container by alternating the adhesive end of each sheet/flag in the stack between opposed first and second ends of the stack (e.g., forming a Z-stack of sheets). Such a stack of Post-it® brand flags and associated shuttling dispenser is disclosed in U.S. Pat. No. 4,770,320. Similarly, a pad of W-stacked sheets and associated dispensers are disclosed in U.S. Pat. Nos. 4,416,392, 4,562,938, 4,586,629, and 4,653,666. This alternating style of stacking the sheets/flags is effective because the sheets/flags are adhesively bonded together with a relatively weak repositionable pressure sensitive adhesive on only one end of the sheet/flag. Such sheets are not suitable for joining or connecting surfaces together because of the relatively small percentages of such sheets coated with adhesive and the relatively weak nature of the pressure sensitive adhesive used with such sheets/flags.

A significant advance in the construction and dispensing of pads of adhesive tape strips is disclosed in U.S. Pat. No. 5,401,547. '547 discloses a pad of superimposed adhesive tape strips wherein the adhesive layer of each tape strip is releasably adhered to an adjacent tape strip at a first adhesion level at a first end and a second adhesion level at a second end (i.e., differential release), and sequential tape strips are longitudinally reversed so as to align the first end of each tape strip with the second end of an immediately overlaying and an immediately underlying tape strip. A preferred manner of achieving such differential release disclosed by '547 is to coat the entire surface area of a first major surface of each strip with a pressure sensitive adhesive and coat the second end portion of the second major surface of each tape strip with a low adhesion backsize. Such an alternately stacked pad of differential release tape strips can be conveniently dispensed from an associated dispenser with a single hand while maintaining a continuous coating of an aggressive pressure sensitive adhesive on the substrate.

While constituting a significant improvement, the pads disclosed by '547 must comply with narrow quality control standards in order to achieve the sliding action required between adjacent tape strips for proper dispensing while preventing fanning of the stacked strips (i.e., preventing the tape strips from accidentally and unintentionally sliding relative to one another before each strip is dispensed). Furthermore, as described in Blackwell et al., when the necessary differential release requirement is achieved by the application of a premium low adhesion backsize on one end of the tape strips and a basic adhesion backsize on the other end, that portion of the tape strip coated with the premium low adhesion backsize does not consistently maintain any written indicia.

WO00/29224 discloses a technique for dispensing a pad of adhesive tape strips which maintains the convenience of one hand dispensing realized with the pads of adhesive tape strips and dispensing technique disclosed by '547 without requiring the pad to adhere to the stringent differential release limitations required by the '547 pads. Briefly, the novel technique involves dispensing each tape strip at a peel angle of less than 45° between the tape strip being dispensed (i.e., the overlying tape strip) and the next tape strip (i.e., the intermediate tape strip) prior to complete separation of the overlying tape strip from the intermediate tape strip and prior to release of a longitudinal end of the intermediate tape strip from the tape strip immediately underneath the intermediate tape strip (i.e., the underlying tape strip).

Unfortunately, the tape pads, tape dispensers and dispensing techniques taught by '547 and WO00/29224 for the dispensing of pressure sensitive adhesive tape strips are not well suited for dispensing larger oversized sheets of pressure sensitive adhesive tape, such as those used as a protective cover over mailing labels, due to the high peel force required to dispense such oversized pressure sensitive adhesive tape sheets and a tendency for the sheets to double over and adhere to itself during dispensing.

Accordingly, a substantial need exists for a pad of adhesive tape sheets, a dispenser for a pad of adhesive tape sheets and/or a dispensing technique capable of easily and reliably dispensing sheets of pressure sensitive adhesive tape with the same convenience provided by the pads, dispensers and dispensing techniques disclosed by '547 and WO00/29224 for the dispensing of pressure sensitive adhesive tape strips.

SUMMARY OF THE INVENTION

We have discovered a stacked pad of pressure sensitive adhesive tape sheets from which individual tape sheets can be easily and reliably dispensed. We have also developed a novel technique and novel dispensers capable of easily and reliably dispensing individual tape sheets from the stacked pad of pressure sensitive adhesive tape sheets.

For purposes of clarity and without intending to be unduly limited thereby, the tape sheets in a group of any three sequentially stacked tape sheets are referenced as an overlying tape sheet, an intermediate tape sheet, and an underlying tape sheet with the adhesive layer of the overlying tape sheet adhered to the intermediate tape sheet, and the adhesive layer of the intermediate tape sheet adhered to the underlying tape sheet.

A first embodiment of the novel stacked pad of adhesive tape sheets comprise a plurality of superimposed tape sheets wherein: (i) the tape sheets are formed from a substrate with an area of differential release which extends less than the full length and width of the substrate, (ii) the second major surface of the substrate includes a layer of an adhesive, (iii) sequential tape sheets are configured and arranged with the area of differential release alternating between first and second corners of the sheets, and (iv) the adhesive layer of each tape sheet is releasably adhered to an adjacent tape sheet at a higher adhesion level, except for the area of differential release which adheres to an adjacent tape sheet at a lower adhesion level. The relative release forces of the first and second adhesion levels are effective for consistently causing the area of an intermediate tape sheet adhered to an immediately underlying tape sheet at the second adhesion level to release from the immediately underlying tape sheet before an overlying tape sheet is completely released from the intermediate tape sheet.

A second embodiment of the novel stacked pad of adhesive tape sheets comprise a plurality of superimposed tape sheets wherein: (i) the tape sheets are formed from a substrate with an area of differential release, (ii) the second major surface of the substrate includes a layer of an adhesive, (iii) sequential tape sheets are configured and arranged with the area of differential release alternating between different areas on the sheets, and (iv) the adhesive layer of each tape sheet is releasably adhered to an adjacent tape sheet at a higher adhesion level, except for the area of differential release which adheres to an adjacent tape sheet at a lower adhesion level. Positioning of the areas of differential release and the relative release forces of the higher and lower adhesion levels are effective for consistently causing the area of an intermediate tape sheet adhered to an immediately underlying tape sheet at the lower adhesion level to release from the immediately underlying tape sheet before an overlying tape sheet is completely released from the intermediate tape sheet when the overlying tape sheet is dispensed at a peel angle of greater than 90°.

A third embodiment of the novel stacked pad of adhesive tape sheets comprise a plurality of superimposed tape sheets wherein: (i) the tape sheets are formed from a substrate with an area of differential release, (ii) the second major surface of the substrate includes a layer of an adhesive, (iii) sequential tape sheets are configured and arranged with the area of differential release alternating between different areas on the sheets, and (iv) the adhesive layer of each tape sheet is releasably adhered to an adjacent tape sheet at a higher adhesion level, except for the area of differential release which adheres to an adjacent tape sheet at a lower adhesion level. Positioning of the areas of differential release and the relative release forces of the higher and lower adhesion levels are effective for consistently causing the area of an intermediate tape sheet adhered to an immediately underlying tape sheet at the lower adhesion level to release from the immediately underlying tape sheet before the overlying tape sheet is completely released from the intermediate tape sheet within the area where the intermediate tape sheet is adhered to the immediately underlying tape sheet at the higher adhesion level.

A first embodiment of the dispenser for dispensing a stacked pad of adhesive tape sheets comprises (i) a base with (A) transversely spaced first and second major surfaces wherein substantially the entire first major surface of the base is exposed, (B) first and second longitudinal ends, and (C) first and second lateral sides, and (ii) a pair of laterally opposed side tabs proximate the first longitudinal end of the base which are transversely spaced from the first major surface of the base and laterally extend inward from the sides of the base so as to extend over the first major surface of the base.

A second embodiment of the dispenser for dispensing a stacked pad of adhesive tape sheets comprises (i) a base with (A) transversely spaced first and second major surfaces, (B) first and second longitudinal ends, and (C) first and second lateral sides, and (ii) a pair of diametrically opposed side tabs with a first tab extending from the first lateral side of the base proximate the first longitudinal end of the base and a second tab extending from the second lateral side of the base proximate the second longitudinal end of the base, wherein the tabs are transversely spaced from the first major surface of the base and laterally extend inward from the sides of the base so as to extend over the first major surface of the base.

A third embodiment of the dispenser for dispensing a stacked pad of adhesive tape sheets comprises (i) a base with (A) transversely spaced first and second major surfaces, (B) first and second longitudinal ends, and (C) first and second lateral sides, and (ii) a pair of laterally opposed side tabs proximate the first longitudinal end of the base which are transversely spaced from the first major surface of the base in a first transverse direction and laterally extend inward from the sides of the base so as to extend over the first major surface of the base. The dispenser is configured and arranged such that an overlying tape sheet may be dispensed from a stacked pad of adhesive tape sheets adhered to the first major surface of the base at a peel angle of greater than 90°.

A first embodiment of the novel technique for dispensing adhesive tape sheets from the stacked pads of adhesive tape sheets of this invention includes the sequential steps of (i) pulling the overlying tape sheet away from the pad so as to effect peeling of the overlying tape sheet from the intermediate tape sheet in a peel direction which is never parallel to the substantially linear interior boundary of the area of differential release between the intermediate tape sheet and the underlying tape sheet, and (ii) continuing to pull the overlying tape sheet away from the pad to sequentially effect (a) release of the intermediate tape sheet from the underlying tape sheet over the area of differential release between the intermediate tape sheet and the underlying tape sheet, and (b) complete separation of the overlying tape sheet from the intermediate tape sheet.

A second embodiment of the novel technique for dispensing adhesive tape sheets from the stacked pads of adhesive tape sheets of this invention includes the sequential steps of (i) pulling the overlying tape sheet away from the pad so as to effect peeling of the overlying tape sheet from the intermediate tape sheet, and (ii) continuing to pull the overlying tape sheet away from the pad to sequentially effect (a) release of an area of the intermediate tape sheet from the underlying tape sheet wherein the area of release extends less than the full length and less than the full width of the intermediate tape sheet, and (b) complete separation of the overlying tape sheet from the intermediate tape sheet.

A third embodiment of the novel technique for dispensing adhesive tape sheets from the stacked pads of adhesive tape sheets of this invention includes the sequential steps of (i) pulling the overlying tape sheet away from the pad as to effect peeling of the overlying tape sheet from the intermediate tape sheet in a peel direction which advances in the same longitudinal direction for each and every tape sheet in the pad, and (ii) continuing to pull the overlying tape sheet away from the pad to sequentially effect (a) release of the intermediate tape sheet from the underlying tape sheet over the area of differential release between the intermediate tape sheet and the underlying tape sheet, and (b) complete separation of the overlying tape sheet from the intermediate tape sheet.

A fourth embodiment of the novel technique for dispensing adhesive tape sheets from the stacked pads of adhesive tape sheets of this invention includes the sequential steps of (i) pulling the overlying tape sheet away from the pad as to effect peeling of the overlying tape sheet from the intermediate tape sheet at a peel angle of greater than 90°, and (ii) continuing to pull the overlying tape sheet away from the pad at a peel angle of greater than 90° to sequentially effect (a) release of the intermediate tape sheet from the underlying tape sheet over the area of differential release between the intermediate tape sheet and the underlying tape sheet, and (b) complete separation of the overlying tape sheet from the intermediate tape sheet.

DETAILED DESCRIPTION OF THE INVENTION INCLUDING BEST MODE

Definitions

Figure 1:
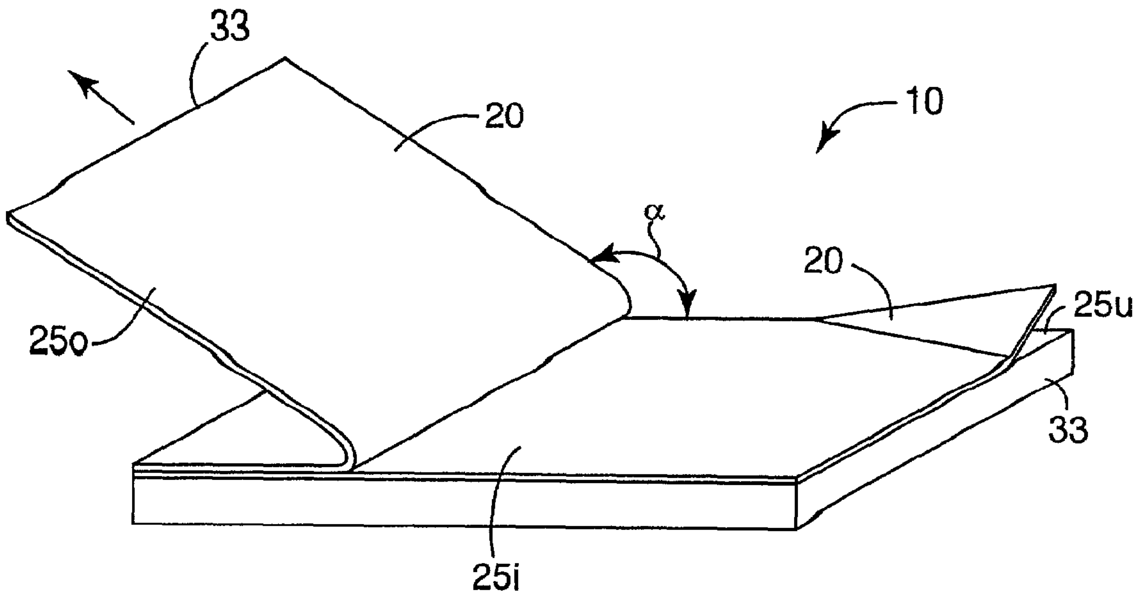
FIG. 1 is a perspective view of one embodiment of a tape sheet pad according to the present invention wherein the first end portion of the overlaying tape sheet has been peeled from the pad and the area of the intermediate tape sheet overlying the area of differential release on the underlying tape sheet is lifted from the underlying tape sheet and suspended in a dispensing position.

As utilized herein, including the claims, the phrase "adhesive tape sheet," refers to a substrate having first and second opposite major surfaces with a coating of a continuous or discontinuous adhesive on the second major surface of the substrate. A sheet is differentiated from a strip by the size of the major surfaces defined by the substrate. A strip is generally longitudinally elongated with a second major surface area of less than about 20 $cm^2$, commonly about 10 to 15 $cm^2$. A sheet may take any of a number of different shapes, and typically has a second major surface area of greater than about 20 $cm^2$.

As utilized herein, including the claims, the term "continuous," when used to describe a coating or layer (e.g., LAB coating), means that the coating or layer covers the entire surface area such that the underlying surface (e.g., substrate) is completely covered.

As utilized herein, including the claims, the term "discontinuous," when used to describe a coating or layer (e.g., LAB coating), means that the coating or layer is pattern coated (e.g., dot matrix, laterally spaced parallel lines, crosshatching, etc.) and covers less than the entire surface area such that portions of the underlying surface (e.g., substrate) remain exposed.

As utilized herein, including the claims, the term "dispensed," when used to describe manipulation of an adhesive tape sheet, means to grasp that portion of the adhesive tape sheet projecting from the pad and pull the adhesive tape sheet so as to peel the adhesive tape sheet from the pad until the adhesive tape sheet detaches completely from the pad and the intermediate tape sheet.

As utilized herein, including the claims, the phrase "differential release," when used to characterize an adhesive tape sheet, means adherence of an adhesive tape sheet to an underlying tape sheet at a different adhesion level.

As utilized herein, including the claims, the term "tail off," when used to describe the defective dispensing of tape sheets from a tape sheet pad, refers to those situations where an overlaying tape sheet separates from an intermediate tape sheet without lifting the area of differential release between the intermediate tape sheet and an underlying tape sheet a distance sufficient to permit the intermediate tape sheet to engage a dispenser and remain spaced from the underlying tape sheet so as to facilitate subsequent dispensing of the intermediate tape sheet. Tail off includes both the phenomenon known as "walk off" (i.e., the overlaying tape sheet separates from an intermediate tape sheet without lifting an area of the intermediate tape sheet) and the phenomenon known as "fall back" (i.e., the area of the intermediate tape sheet adhered to an underlying tape sheet at a differential release is separated from the underlying tape sheet during dispensing of the overlaying tape sheet, but does not separate far enough to prevent the intermediate tape sheet from returning to the pad and reengaging the underlying tape sheet when the overlaying tape sheet is separated from the intermediate tape sheet). An intermediate tape sheet subjected to "tail off" is difficult to dispense because a portion of the "tailed off" tape sheet is not properly presented for dispensing and a user must attempt to initiate separation of the "tailed off" tape sheet from the pad by picking at the edge the "tailed off" tape sheet.

As utilized herein, including the claims, the phrase "release force," refers to the force required to achieve release of a tape sheet from an immediately adjacent tape sheet measured in accordance with ASTM D3811.

As utilized herein, including the claims, the phrase "peel angle," refers to the angle between an adhesive tape sheet being peeled from the pad and an immediately adjacent tape sheet on the pad, measured at the point of departure (i.e., the location along adjacent adhesive tape sheets where the sheets lose contact with one another).

As utilized herein, including the claims, the phrase "point of departure," refers to the linear position between adjacent overlying and intermediate adhesive tape sheets where the sheets lose contact with one another as the overlying tape sheet is peeled from the intermediate tape sheet.

As utilized herein, including the claims, a "stacked pad of adhesive tape sheets," refers to a pad of superimposed differential release adhesive tape sheets with the adhesive layer of each tape sheet releasably adhered to an adjacent tape sheet and the area of differential release on sequential tape sheets translocated to different areas on the pad, with the translocation preferably an alternation between two areas on the pad.

| NOMENCLATURE | |
|---|---|
| 10 | Pad |
| 20 | Tape Sheet |
| 21 | Uppermost Tape Sheet |
| 25i | Intermediate Tape Sheet |
| 25o | Overlaying Tape Sheet |
| 25u | Underlying Tape Sheet |
| 29 | Lowermost Tape sheet |
| 30 | Substrate |
| 31 | First Major Surface of Substrate |
| 32 | Second Major Surface of Substrate |
| 33 | First Longitudinal End of Substrate/Tape sheet |
| 34 | Second Longitudinal End of Substrate/Tape sheet |
| 40 | Low Adhesion Backsize |
| 40b | Basic Low Adhesion Backsize |
| 40s | Superior Release Low Adhesion Backsize |
| 40s' | Continuous Coating of Superior Release Low Adhesion Backsize |
| 40s" | Discontinuous Coating of Superior Release Low Adhesion Backsize |
| 4Os"$^{h}$ | Highly Discontinuous Coating of Superior Release Low Adhesion Backsize |
| 40S"$^{m}$ | Moderately Discontinuous Coating of Superior Release Low Adhesion Backsize |
| 50 | Adhesive |
| 50b | Basic Release Adhesive (higher tack) |
| 50s | Superior Release Adhesive (lower tack) |
| 50' | Continuous Coating of Adhesive |
| 50" | Discontinuous Coating of Adhesive |
| 50"$^{h}$ | Highly Discontinuous Coating of Adhesive |
| 50"$^{m}$ | Moderately Discontinuous Coating of Adhesive |
| 60 | Leader Sheet |
| 65 | Nonadhesive Tab on Leader Sheet |
| 70 | Backing |
| 80 | Double-Faced Adhesive Tape |
| 90 | Release Liner |
| 100 | Dispenser |
| 110 | Base of Dispenser |
| 110x | Width of Base |
| 110y | Length of Base |
| 111 | First Major Surface of Base |
| 112 | Second Major Surface of Base |
| 113 | First Longitudinal End of Base |
| 114 | Second Longitudinal End of Base |
| 115 | First Lateral Side of Base |
| 116 | Second Lateral Side of Base |
| 120 | Tabs |

-continued

| NOMENCLATURE | |
|---|---|
| 120a | First Tab |
| 120b | Second Tab |
| 130 | Sidewalls of Dispenser |
| 130a | First Sidewall |
| 130b | Second Sidewall |
| α | Peel Angle |

Construction

Individual Tape Sheets

Substrate

The substrate 30 is preferably rectangular in shape with a longitudinal length of about 4 to 20 cm, a lateral width of about 4 to 20 cm and a major surface area of greater than about 20 $cm^2$. Tape sheets 20 within these dimensions accommodate most practical uses of such tape sheets 20. Other shapes may also be employed, including specifically, but not exclusively, square, circular, elliptical, triangular, and polygonal shapes.

Substrates 30 suitable for use in construction of the adhesive tape sheets 20 include substantially any flat, flexible material having the necessary structural integrity. Suitable materials include (i) polymeric films of brightened acetate, unbrightened acetate, thermosets, thermoplastics such as polyester, polypropylene, and vinyl polymers, (ii) paper, and (iii) metal foil. Various laminated combinations of such materials may also be used. For many applications, the substrate 30 is preferably transparent so that the surfaces connected or joined by the adhesive tape sheet 20 may be seen through the tape sheet 20.

An acetate film suitable for use as the substrate 30 is described in U.S. Pat. No. 2,927,868.

Low Adhesion Backsize

The first major surface 31 of the substrate 30 is coated with low adhesion backsize 40, commonly referenced as LAB. As shown in FIG. 8*b*, one embodiment of the tape sheets 20 has the entire first major surface 31 of the substrate 30 coated with a basic release low adhesion backsize 40*b*, with a corner area overcoated with a superior release low adhesion backsize 40*s*.

Low adhesion backsize refers to a material capable of readily releasing from a layer of a pressure sensitive adhesive. A number of materials suitable for use as a low adhesion backsize are known to those skilled in the art, including specifically, but not exclusively silicones, fluorocarbons, acrylates, urethanes, chrome complexes, grafted and block siloxane hydrocarbons, and blends of these materials. Specific examples of suitable low adhesion backsize compositions are described in U.S. Pat. Nos. 4,279,717 and 4,421,904 to Eckberg et al, and U.S. Pat. No. 4,313,900 to Koshar et al. Other materials suitable for use as the low adhesion backsize according to the present invention are described in U.S. Pat. Nos. 2,532,011 and 2,607,711 to Dahlquist et al., and U.S. Pat. No. 2,607,711 to Hendricks. Preferred low adhesion backsizes are ink receptive (i.e., accept and retain markings created with an ink pen).

Adhesive

The second major surface 32 of the substrate 30 is coated with a pressure sensitive adhesive 50. The layer of pressure sensitive adhesive 50 is preferably uniform over the entire surface of the substrate 30 and formed from a single type of adhesive having an adhesion to glass of less than about 30 ounces per inch (34 grams/millimeter) when measured in accordance with the adhesion to glass testing protocol set forth herein.

The pressure sensitive adhesive 50 may be selected from any of the known pressure sensitive adhesives, including acrylic, silicone, and rubber-resin pressure sensitive adhesives. By way of example, the pressure sensitive adhesive 50 may be an acrylic adhesive comprised of isooctyl acrylate (IOA) and acrylic acid (AA). Adhesives suitable for use with the present invention are described in U.S. Pat. No. 2,926,105 to Steinhauser et al., U.S. Pat. No. 3,331,729 to Danielson et al., U.S. Pat. No. 3,578,622 to Brown et al., and U.S. Pat. No. 4,835,217 and 4,699,842 to Jorgensen et al. Relatively weak adhesives, such as the acrylate-based microsphere adhesives disclosed in U.S. Pat. No. 3,691,140 to Silver, are also suitable for use as the adhesive 50 in accordance with the present invention.

Primer

The first 31 and/or second 32 major surfaces of the substrate 30 may optionally include a primer layer (not shown) between the substrate 30 and the corresponding layer of low adhesion backsize 40 and/or adhesive 50 for purposes of enhancing adhesion of the low adhesion backsize 40 and/or adhesive 50 to the substrate 30. Substantially any of the known primers may be satisfactorily used in the present invention without affecting performance of the low adhesion backsize 40 or the adhesive 50. Alternatively, the substrate 30 may be corona or flame treated.

Pad of Adhesive Tape Sheets

Referring generally to FIGS. 8*a* through 8*g* and FIG. 10, a plurality (e.g., 10 to 250, generally 20 to 100) of individual tape sheets 20 are stacked and aligned to form a pad 10 of the adhesive tape sheets 20 with the coating of pressure sensitive adhesive 50 on each tape sheet 20 adhering the tape sheet 20 to an immediately adjacent tape sheet 20. A supportive backing 70 may be adhesively bonded to the second major surface 32 of the lowermost tape sheet 29.

For purposes of clarity and without intending to be unduly limited thereby, a group of any three sequentially stacked tape sheets 20 in the pad 10 shall hereinafter be referenced as a "dispensing set" of tape sheets 20 with the tape sheet 20 having an exterior facing first major surface 31 (i.e., the surface coated with LAB 40) referenced as the overlaying tape sheet 25*o*, the tape sheet 20 having an exterior facing second major surface 32 (i.e., the surface coated with adhesive 50) referenced as the underlying tape sheet 25*u*, and the tape sheet 20 sandwiched between the overlaying 25*o* and the underlying 25*u* tape sheets referenced as the intermediate tape sheet 25*i*.

The tape sheets 20 are constructed to provide an area of differential release between sequential tape sheets 20, such that the adhesive 50 adheres sequential tape sheets 20 at a first (higher) adhesion level in the area of ordinary release (i.e., the major surface area of the substrate 30 minus the area of differential release) and adheres sequential tape sheets 20 at a second (lower) adhesion level in the area of differential release.

Figure 2:
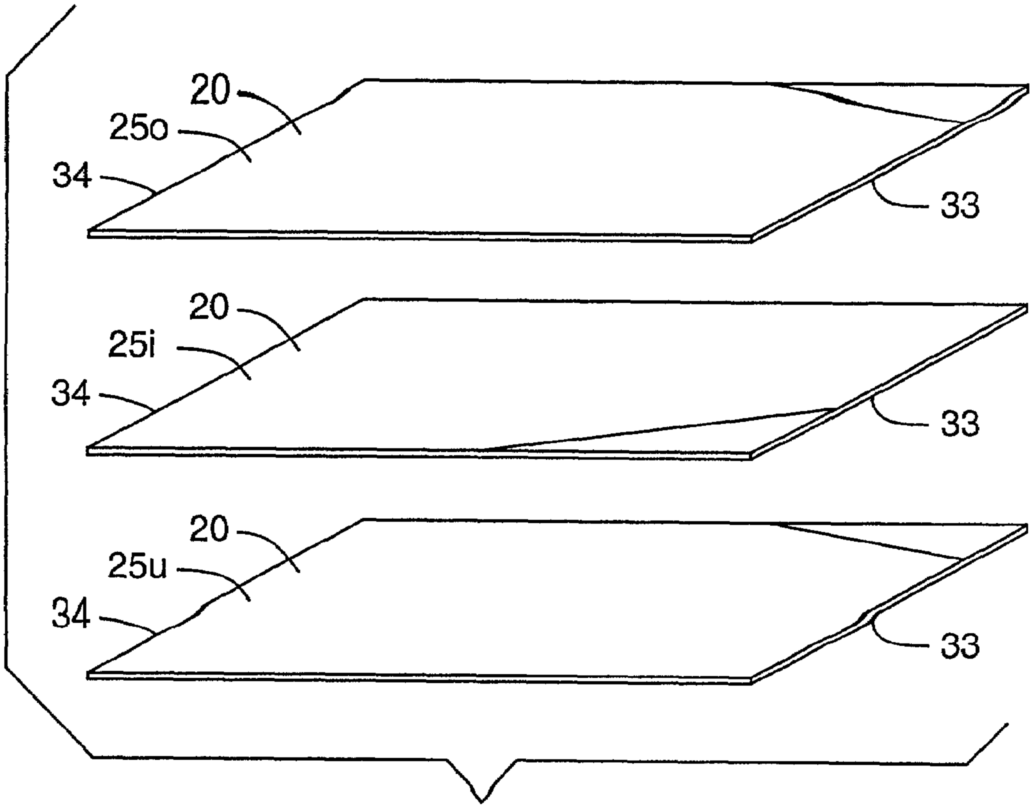
FIG. 2 is an exploded perspective view of the overlaying, intermediate and underlying sheets of the tape sheet pad shown in FIG. 1.
Figure 4:
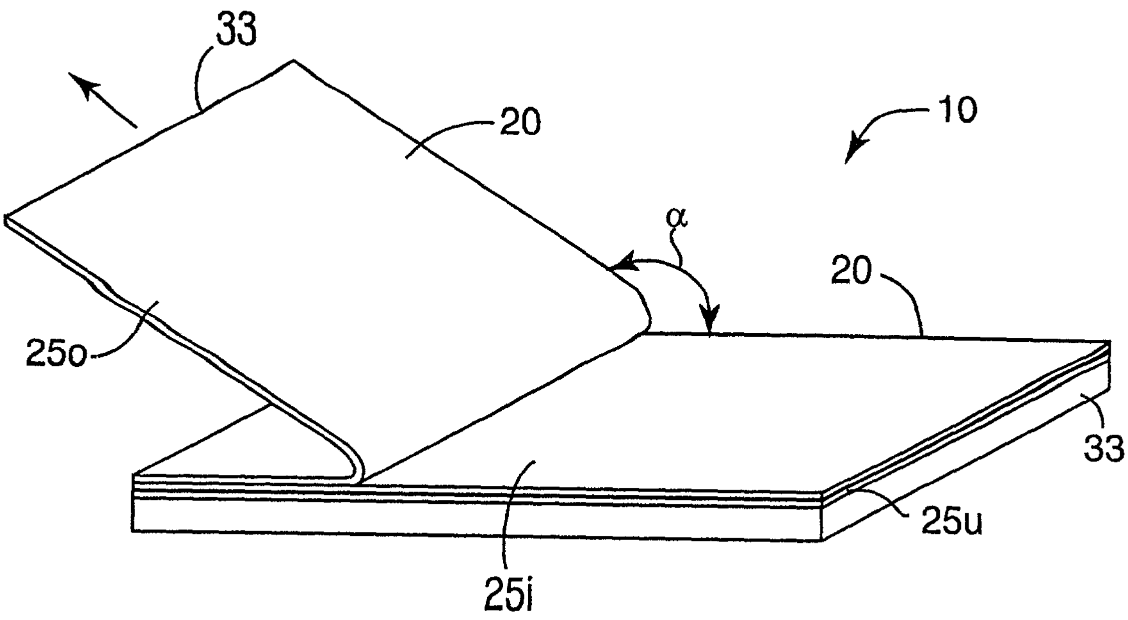
FIG. 4 is a perspective view of a second embodiment of a tape sheet pad according to the present invention wherein the overlaying tape sheet is almost completely peeled from the pad and the area of the intermediate tape sheet overlying the area of differential release on the underlying tape sheet is lifted from the underlying tape sheet and suspended in a dispensing position.
Figure 5:
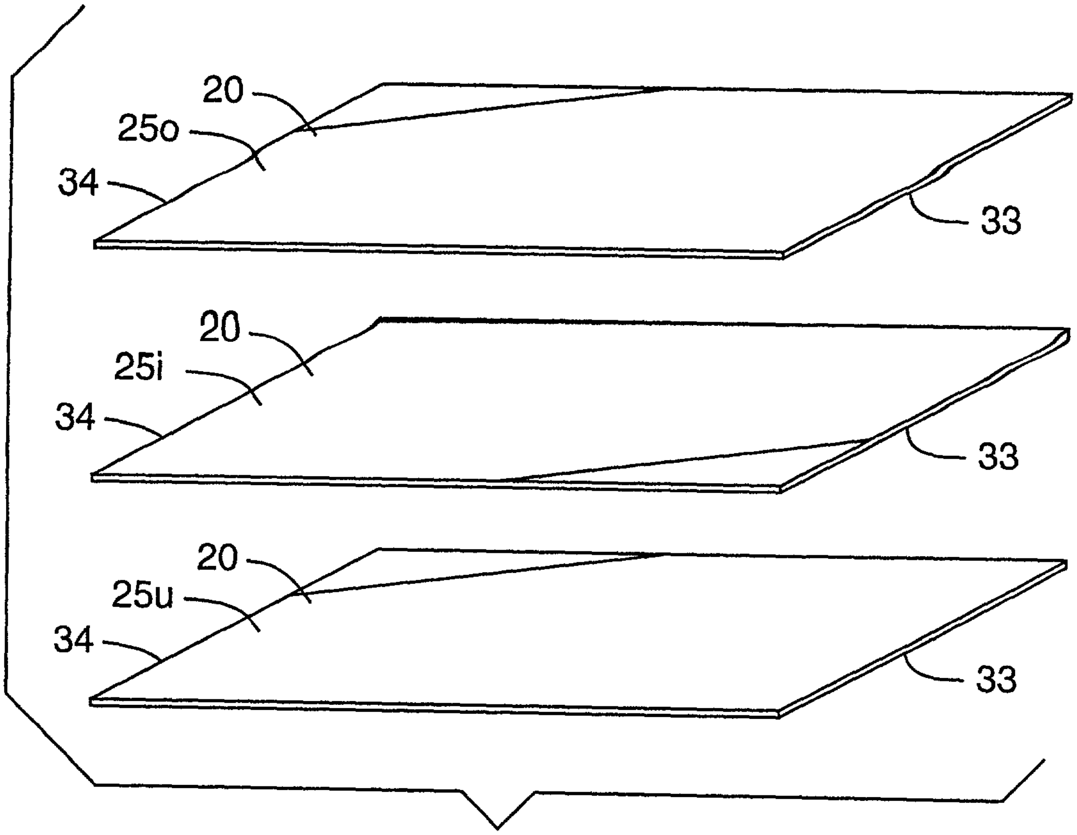
FIG. 5 is an exploded perspective view of the overlaying, intermediate and underlying sheets of the tape sheet pad shown in FIG. 4.
Figure 6:
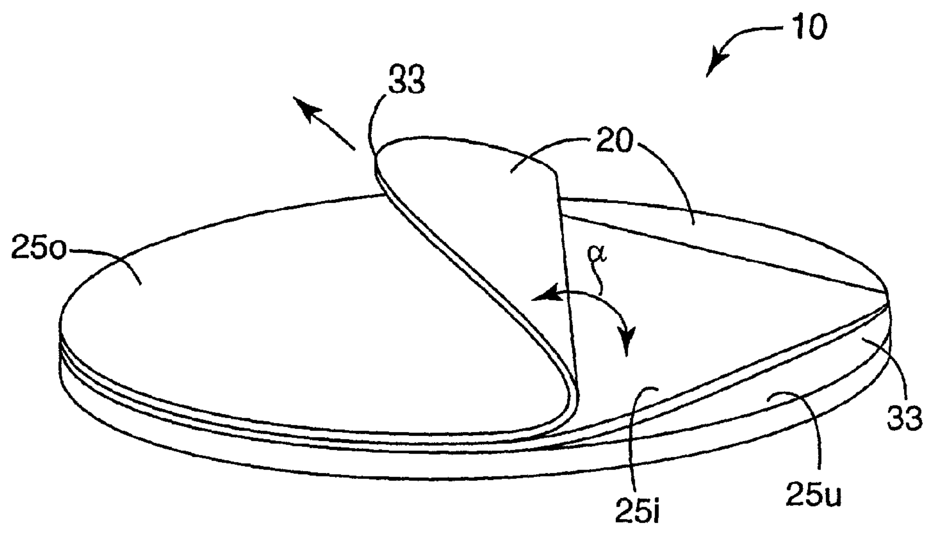
FIG. 6 is a perspective view of a third embodiment of a tape sheet pad according to the present invention wherein the first end portion of the overlaying tape sheet has been peeled from the pad and the area of the intermediate tape sheet overlying the area of differential release on the underlying tape sheet is lifted from the underlying tape sheet and suspended in a dispensing position.
Figure 7:
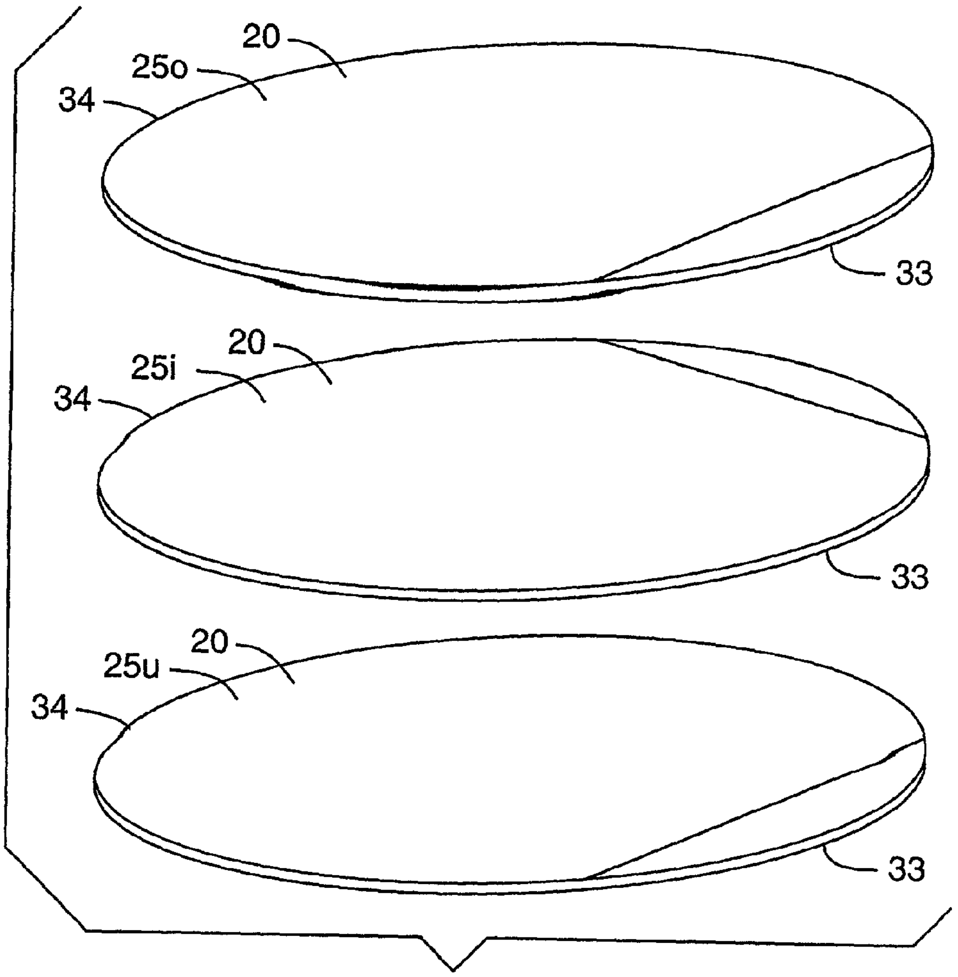
FIG. 7 is an exploded perspective view of the overlaying, intermediate and underlying sheets of the tape sheet pad shown in FIG. 6.

The areas of differential release may have any desired size and shape, but preferably extend less than the full length and width of the substrate 30, preferably less than one-half the length and less than one-half the width of the substrate 30, and most preferably less than one-half the length and one-fourth the width of the substrate 30. When the substrate 30 is rectangular in shape, the areas of differential release are preferably triangular in shape and located in the corners of the substrate 30, with the areas of differential release translocated to different corners on successive tape sheets 20, such as (i) alternating between two corners disposed along a common longitudinal end 33 or 34 of the substrate 30 as shown in FIGS. 1-3, (ii) alternating between diametrically opposed corners of the substrate 30 as shown in FIGS. 4 and 5, (iii) alternating between corners located along a common lateral side (unnumbered) of the substrate 30, not shown, (iv) rotating clockwise or counterclockwise within all four corners of the substrate 30, not shown, or (v) randomly moved amongst the four corners of the substrate 30, not shown. Similarly, when the substrate 30 is circular in shape, the areas of differential release preferably form segments, with the areas of differential release translocated to different quarter sectors on successive tape sheets 20, such as (i) alternately positioned within two adjacent quarter sectors of the substrate 30 as shown in FIGS. 6 and 7, (ii) alternately positioned within diametrically opposed quarter sectors of the substrate 30, not shown, (iii) rotating clockwise or counterclockwise within all four quarter sectors of the substrate 30, not shown, or (iv) randomly moved amongst the four quarter sectors of the substrate 30, not shown.

When the pad 10 is constructed to provide areas of differential release which alternate between two corners disposed along a common longitudinal end 33 or 34 of the substrate 30, dispensing is simplified as the peel direction advances in the same longitudinal direction for each and every tape sheet 20 in the pad 10 rather than alternating between longitudinal ends 33 and 34.

The relative release forces of the first and second adhesion levels are effective for consistently causing the area of an intermediate tape sheet 25*i* adhered to an immediately underlying tape sheet 25*u* at the second adhesion level (i.e., the area of lower adhesion level) to release from the immediately underlying tape sheet 25*u* before an overlying tape sheet 25*o* is completely released from the intermediate tape sheet 25*i*.

Figure 8A:
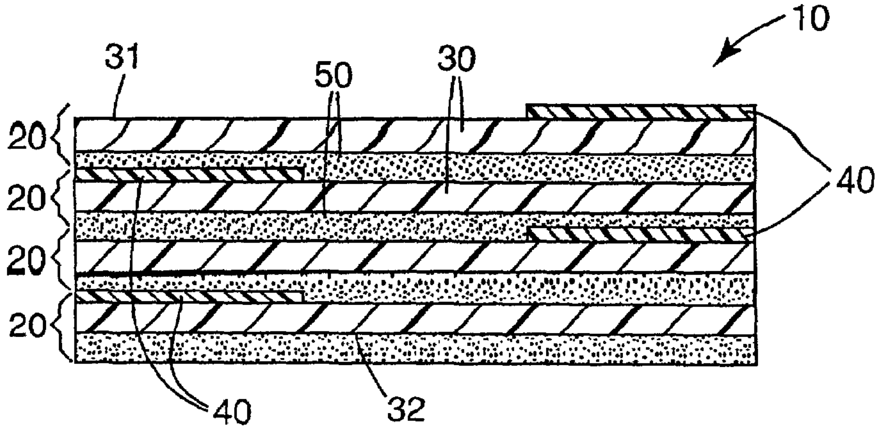
FIG. 8*a* is an enlarged end view of a first embodiment of the tape sheet pad according to the present invention wherein differential release is effected by a low adhesion backsize coating on alternating corners of the tape sheets.
Figure 8B:
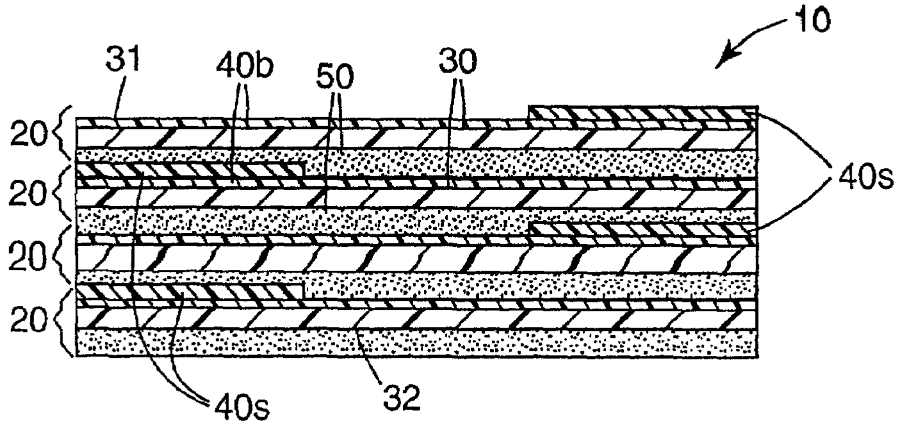
FIG. 8*b* is an enlarged end view of a second embodiment of the tape sheet pad according to the present invention wherein differential release is effected by a basic low adhesion backsize coating over the entire first major surface of the substrate and a superior release low adhesion backsize coating over the basic low adhesion backsize coating on alternating corners of the tape sheets.

A first embodiment of a differential release tape sheet pad 10 according to the present invention is shown in FIG. 8*a*. The individual tape sheets 20 include a coating of a low adhesion backsize 40 over a corner of the first major surface 31 of the substrate 30 and a coating of a pressure sensitive adhesive 50 over the entire second major surface 32 of the substrate 30. The tape sheets 20 are stacked with the low adhesion backsize coated corners of successive sheets 20 alternating between opposite corners disposed along a common longitudinal end 33 or 34 of the substrate 30. The substrate 30, low adhesion backsize 40 and adhesive 50 should be selected and coated so as to provide a first (higher) adhesive level between the adhesive 50 of a first tape sheet 20 and the substrate 30 of a second tape sheet 20, and a second (lower) adhesive level between the adhesive 50 on the first tape sheet 20 and the low adhesion backsize 40 on the second tape sheet 20.

A second embodiment of a differential release tape sheet pad 10 according to the present invention is shown in FIG. 8*b*. The individual tape sheets 20, shown in FIG. 8*b*, include a coating of a basic release low adhesion backsize 40*b* over the entire first major surface 31 of the substrate 30, a coating of a superior low adhesion backsize 40*s* over the coating of basic release low adhesion backsize 40*b* in one corner of the sheet 20, and a coating of a pressure sensitive adhesive 50 over the entire second major surface 32 of the substrate 30. The tape sheets 20 are stacked with the corners of successive sheets 20 coated with the superior low adhesion backsize 40*s* alternating between opposite corners disposed along a common longitudinal end 33 or 34 of the substrate 30. The substrate 30, basic low adhesion backsize 40*b*, superior low adhesion backsize 40*s* and adhesive 50 should be selected and coated so as to provide a first (higher) adhesive level between the adhesive 50 of a first tape sheet 20 and the basic low adhesion backsize 40*b* of a second tape sheet 20, and a second (lower) adhesive level between the adhesive 50 of the first tape sheet 20 and the superior low adhesion backsize coating 40*s* of the second tape sheet 20.

Figure 8C:
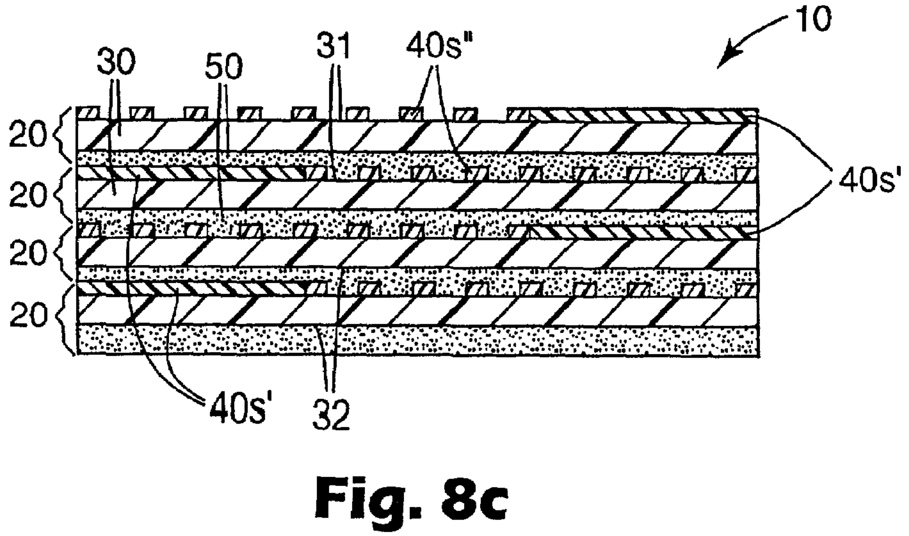
FIG. 8*c* is an enlarged end view of a third embodiment of the tape sheet pad according to the present invention wherein differential release is effected by a continuous coating of a low adhesion backsize on alternating corners of the first major surface of sequential tape sheets with a discontinuous coating of the low adhesion backsize over the balance of first major surface of the tape sheets.

A third embodiment of a differential release tape sheet pad 10 according to the present invention is shown in FIG. 8*c*. The individual tape sheets 20 include a continuous coating of a superior release low adhesion backsize 40*s*' over a corner of the first major surface 31 of the substrate 30, a discontinuous coating of the superior release low adhesion backsize 40*s*" over the balance of the first major surface 31 of the substrate 30 so as to form a discontinuous pattern coating of the superior release low adhesion backsize 40*s*", and a coating of a pressure sensitive adhesive 50 over the entire second major surface 32 of the substrate 30. The tape sheets 20 are stacked with the continuously coated corners of successive sheets 20 alternating between opposite corners disposed along a common longitudinal end 33 or 34 of the substrate 30. The substrate 30, superior release low adhesion backsize 40*s*, and adhesive 50 are selected and pattern coated to provide a second (lower) adhesive level between the adhesive 50 of the first tape sheet 20 and the corner of the first major surface 31 of the second tape sheet 20 continuously coated with superior release low adhesion backsize 40*s*', and a first (higher) adhesive level between the adhesive 50 of the first tape sheet 20 and the balance of the first major surface 31 of the second tape sheet 20 discontinuously coated with superior release low adhesion backsize 40*s*".

Figure 8D:
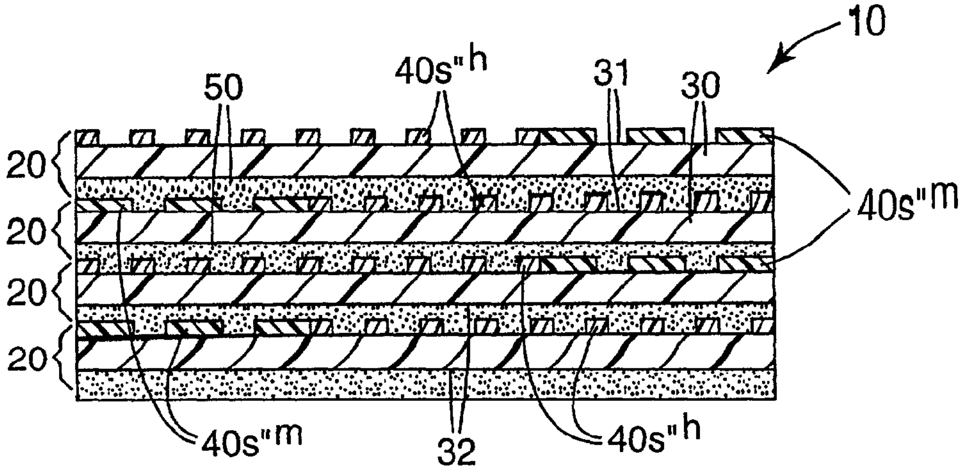
FIG. 8*d* is an enlarged end view of a fourth embodiment of the tape sheet pad according to the present invention wherein differential release is effected by a moderately discontinuous coating of a low adhesion backsize on alternating corners of the first major surface of sequential tape sheets and a highly discontinuous coating of the low adhesion backsize over the balance of the first major surface of the tape sheets.

A fourth embodiment of a differential release tape sheet pad 10 according to the present invention is shown in FIG. 8*d*. The individual tape sheets 20 include a moderately discontinuous coating of a superior release low adhesion backsize 40*s*'''m over a corner of the first major surface 31 of the substrate 30, a highly discontinuous coating of the superior release low adhesion backsize 40*s*'''h over the balance of the first major surface 31 of the substrate 30, and a coating of a pressure sensitive adhesive 50 over the entire second major surface 32 of the substrate 30. The tape sheets 20 are stacked with the moderately discontinuously coated corners of successive sheets 20 alternating between opposite corners disposed along a common longitudinal end 33 or 34 of the substrate 30. The substrate 30, superior release low adhesion backsize 40*s*, and adhesive 50 are selected and pattern coated to provide a second (lower) adhesive level between the adhesive 50 of the first tape sheet 20 and the moderately discontinuously coated corner of the first major surface 31 of the second tape sheet 20, and a first (higher) adhesive level between the adhesive 50 of the first tape sheet 20 and the highly discontinuously coated balance of the first major surface 31 of the second tape sheet 20.

Figure 8E:
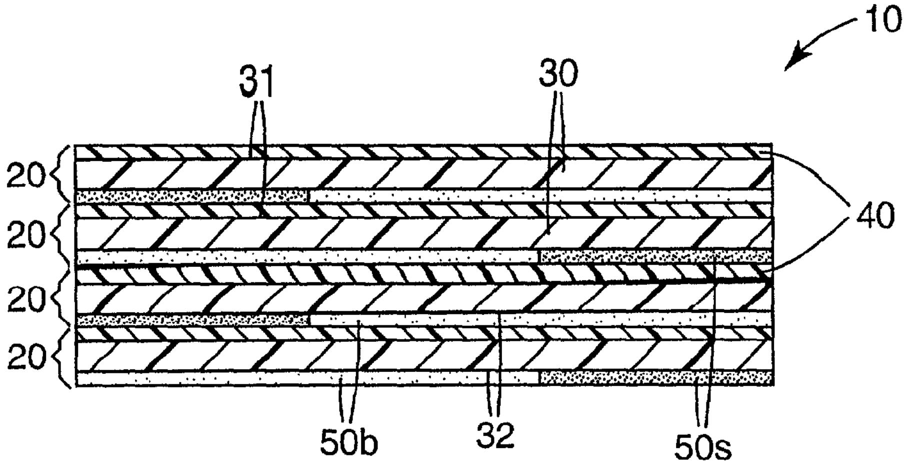
FIG. 8*e* is an enlarged end view of a fifth embodiment of the tape sheet pad according to the present invention wherein differential release is effected by a coating of an adhesive having a first lower adhesion level on alternating corners of the second major surface of sequential tape sheets and a coating of an adhesive having a second higher adhesion level over the balance of the second major surface of the tape sheets.

A fifth embodiment of a differential release tape sheet pad 10 according to the present invention is shown in FIG. 8*e*. The individual tape sheets 20 include a coating of a superior (lower) release adhesive 50*s* over a corner of the second major surface 32 of the substrate 30, a coating of a basic (higher) release adhesive 50*b* over the balance of the second major surface 32 of the substrate 30, and a coating of a low adhesion backsize 40 over the entire first major surface 31 of the substrate 30. The tape sheets 20 are stacked with the corners of successive sheets 20 coated with a superior (lower) release adhesive 50*s* alternating between opposite corners disposed along a common longitudinal end 33 or 34 of the substrate 30. The substrate 30, low adhesion backsize 40, superior release adhesive 50*s* and basic release adhesive 50*b* are selected to provide a second (lower) adhesive level between the corner of the first tape sheet 20 coated with the superior release adhesive 50*s* and the low adhesion backsize 40 on the first major surface 31 of the second tape sheet 20, and a first (higher) adhesive level between the balance of the first tape sheet 20 coated with the basic release adhesive 50*b* and the low adhesion backsize 40 on the first major surface 31 of the second tape sheet 20.

Figure 8F:
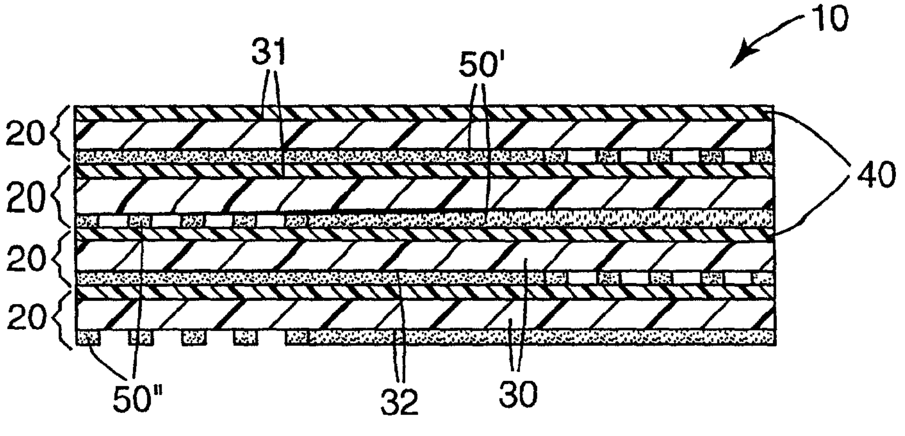
FIG. 8*f* is an enlarged end view of a sixth embodiment of the tape sheet pad according to the present invention wherein differential release is effected by a discontinuous coating of an adhesive on alternating corners of the second major surface of sequential tape sheets and a continuous coating of the adhesive over the balance of the second major surface of the tape sheets.

A sixth embodiment of a differential release tape sheet pad 10 according to the present invention is shown in FIG. 8*f*. The individual tape sheets 20 include a discontinuous coating of an adhesive 50" over a corner of the second major surface 32 of the substrate 30 so as to form a pattern coating of the adhesive 50, a continuous coating of an adhesive 50' over the balance of the second major surface 32 of the substrate 30, and a coating of a low adhesion backsize 40 over the entire first major surface 31 of the substrate 30. The tape sheets 20 are stacked with discontinuously coated corners of successive sheets 20 alternating between opposite corners disposed along a common longitudinal end 33 or 34 of the substrate 30. The substrate 30, low adhesion backsize 40, and adhesive 50 are selected and pattern coated to provide a second (lower) adhesive level between the corner of the first tape sheet 20 discontinuously coated with adhesive 50" and the low adhesion backsize 40 on the first major surface 31 of the second tape sheet 20, and a first (higher) adhesive level between the balance of the first tape sheet 20 continuously coated with adhesive 50' and the low adhesion backsize 40 on the first major surface 31 of the second tape sheet 20.

Figure 8G:
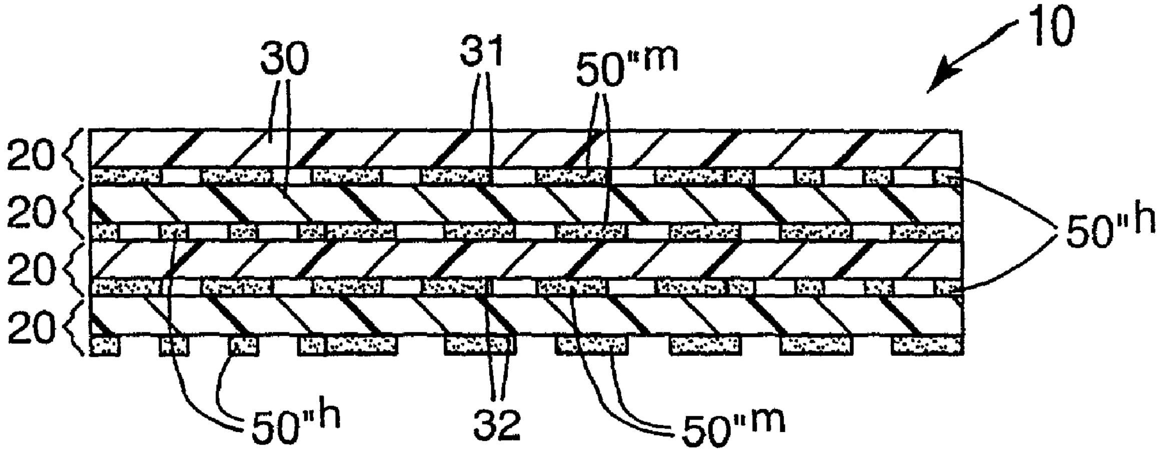
FIG. 8*g* is an enlarged end view of a seventh embodiment of the tape sheet pad according to the present invention wherein differential release is effected in the absence of low adhesion backsize by a highly discontinuous coating of an adhesive on alternating corners of the second major surface of sequential tape sheets and a moderately discontinuous coating of the adhesive over the balance of the second major surface of the tape sheets.
Figure 9A:
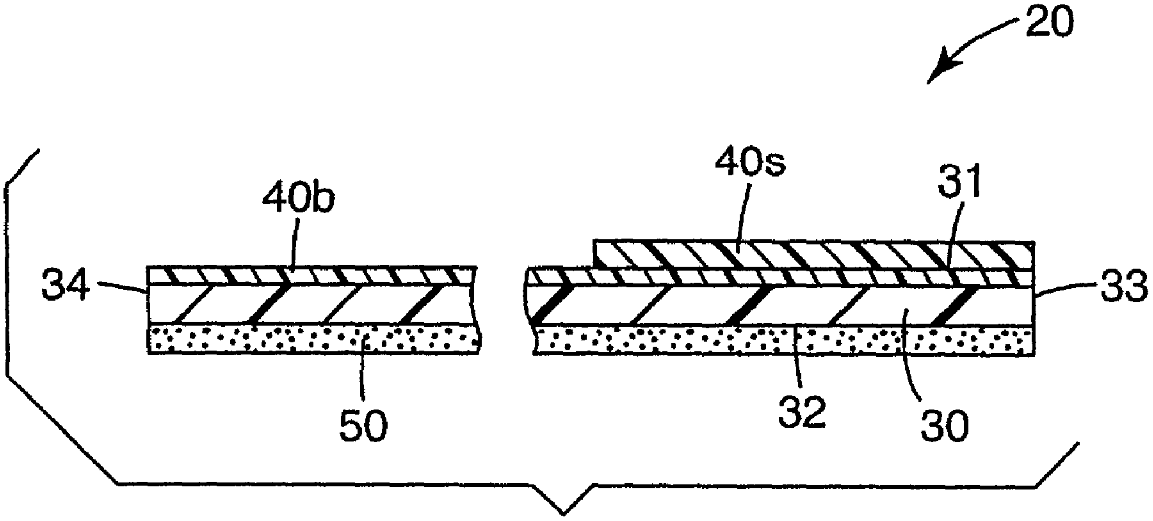
FIG. 9*a* is an enlarged sectional end view of a single tape sheet as shown in FIG. 8*b*.
Figure 9B:
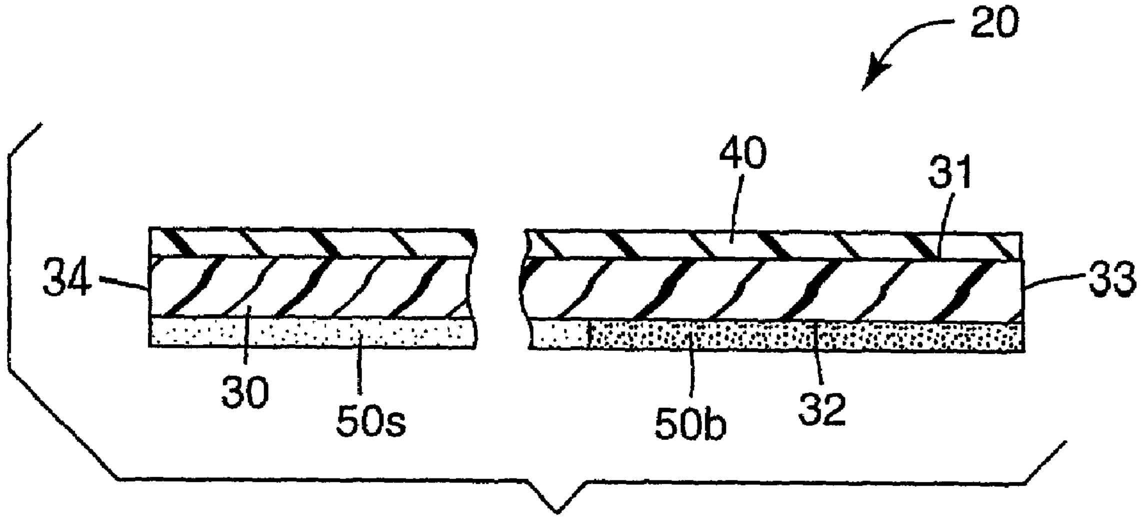
FIG. 9*b* is an enlarged sectional end view of a single tape sheet as shown in FIG. 8*e*.

A seventh embodiment of a differential release tape sheet pad 10 according to the present invention is shown in FIG. 8*g*. The individual tape sheets 20 include a highly discontinuous coating of an adhesive 50"*h* over a corner of the second major surface 32 of the substrate 30, a moderately discontinuous coating of an adhesive 50"*m* over the balance of the second major surface 32 of the substrate 30, and a coating of a low adhesion backsize 40 over the entire first major surface 31 of the substrate 30. The tape sheets 20 are stacked with the highly discontinuously coated corners of successive sheets 20 alternating between opposite corners disposed along a common longitudinal end 33 or 34 of the substrate 30. The substrate 30, low adhesion backsize 40, and adhesive 50 are selected and pattern coated to provide a second (lower) adhesive level between the highly discontinuously coated corner of the first tape sheet 20 and the low adhesion backsize 40 on the first major surface 31 of the second tape sheet 20, and a first (higher) adhesive level between the moderately discontinuously coated balance of the first tape sheet 20 and the low adhesion backsize 40 on the first major surface 31 of the second tape sheet 20.

It is also possible to construct a differential release tape sheet pad 10 according to the present invention by combining changes in the type and/or coating pattern of both the low adhesion backsize 40 and the pressure-sensitive adhesive 50.

The pad 10 may packaged and sold alone, for later insertion into a dispenser 100, or packaged and sold in combination with a reusable or disposable dispenser 100.

For purposes of clarity and without intending to be unduly limited thereby, the balance of the disclosure directed to construction of the tape sheet pad 10 and dispensing of individual tape sheets 20 from the tape sheet pad 10 shall be based upon the second embodiment of the tape sheet pad 10 shown in FIG. 8*b* (i.e., differential release is effected by coating a basic release low adhesion backsize 40*b* over the entire first major surface 31 of the substrate 30 with a coating of a superior low adhesion backsize 40*s* over the basic release low adhesion backsize 40*b* in one corner of the tape sheet 20) unless otherwise stated.

In order to provide easy, consistent and reliable dispensing of a single tape sheet 20 using a dispenser 100, the second (lower) adhesion level should provide a release force of less than 160 grams per inch and the first (higher) adhesion level should provide a release force of at least about 100 grams per inch, with a ratio of the first (higher) adhesion level and the second (lower) adhesion level at least 1.5:1. A second (lower) adhesion level of greater than about 160 grams per inch can cause tail off (i.e., an overlaying tape sheet 25*o* is dispensed from the tape sheet pad 10 before the second end 34 of an intermediate tape sheet 25*i* is separated from the first end 33 of an underlying tape sheet 25*u* a sufficient distance for the second end 34 of the intermediate tape sheet 25*i* to engage the dispenser 100) while a first (higher) adhesion level of less than about 100 grams per inch can also cause tail off.

A preferred embodiment of the tape sheet 20 has an area of differential release covering between about 1/20$^{th}$ to 1/4$^{th}$ of the surface area of the tape sheet 20.

Dispenser

Figure 11:
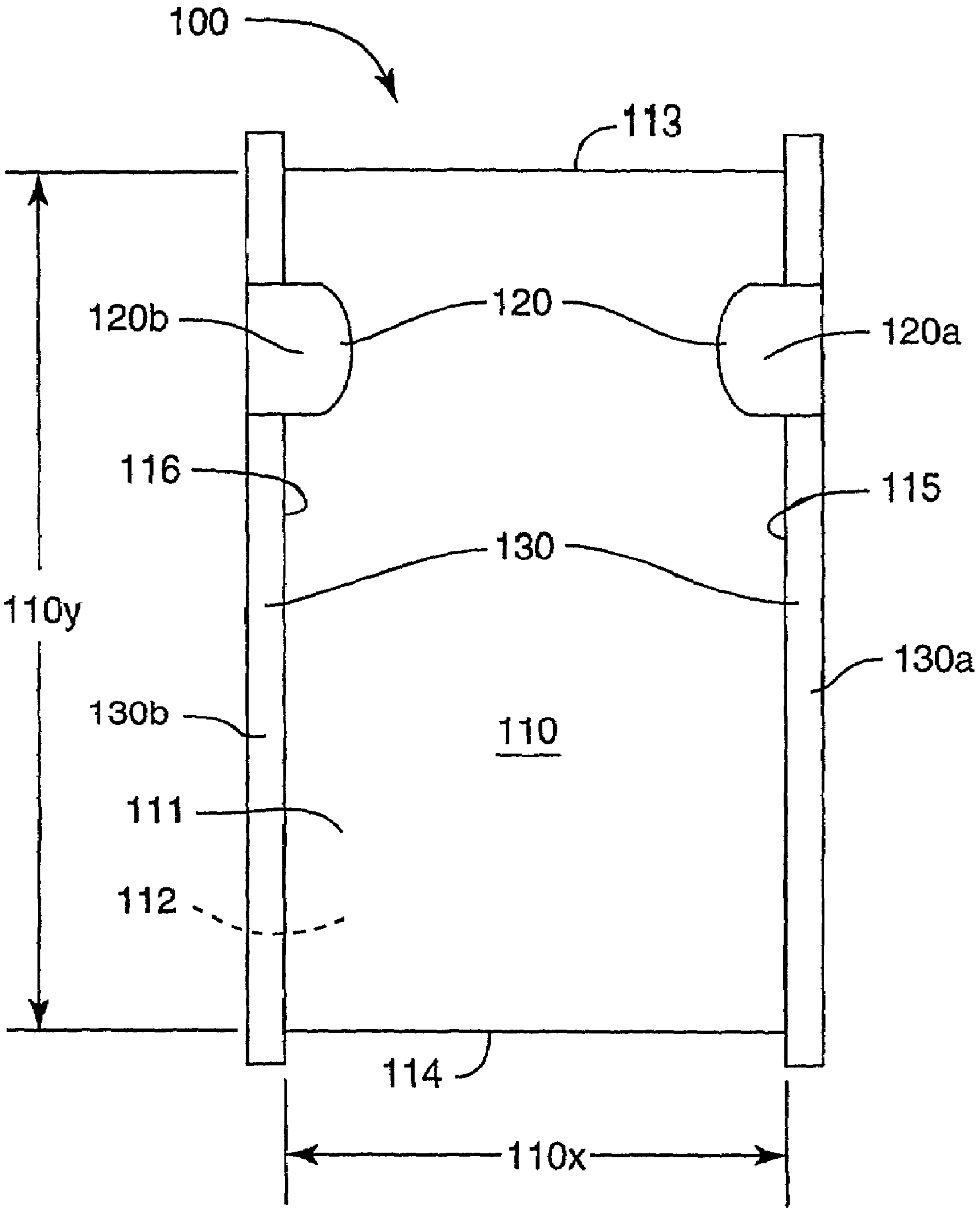
FIG. 11 is a top view of a first embodiment of a dispenser according to the present invention for the tape sheet pads shown in FIGS. 1-3.
Figure 12:
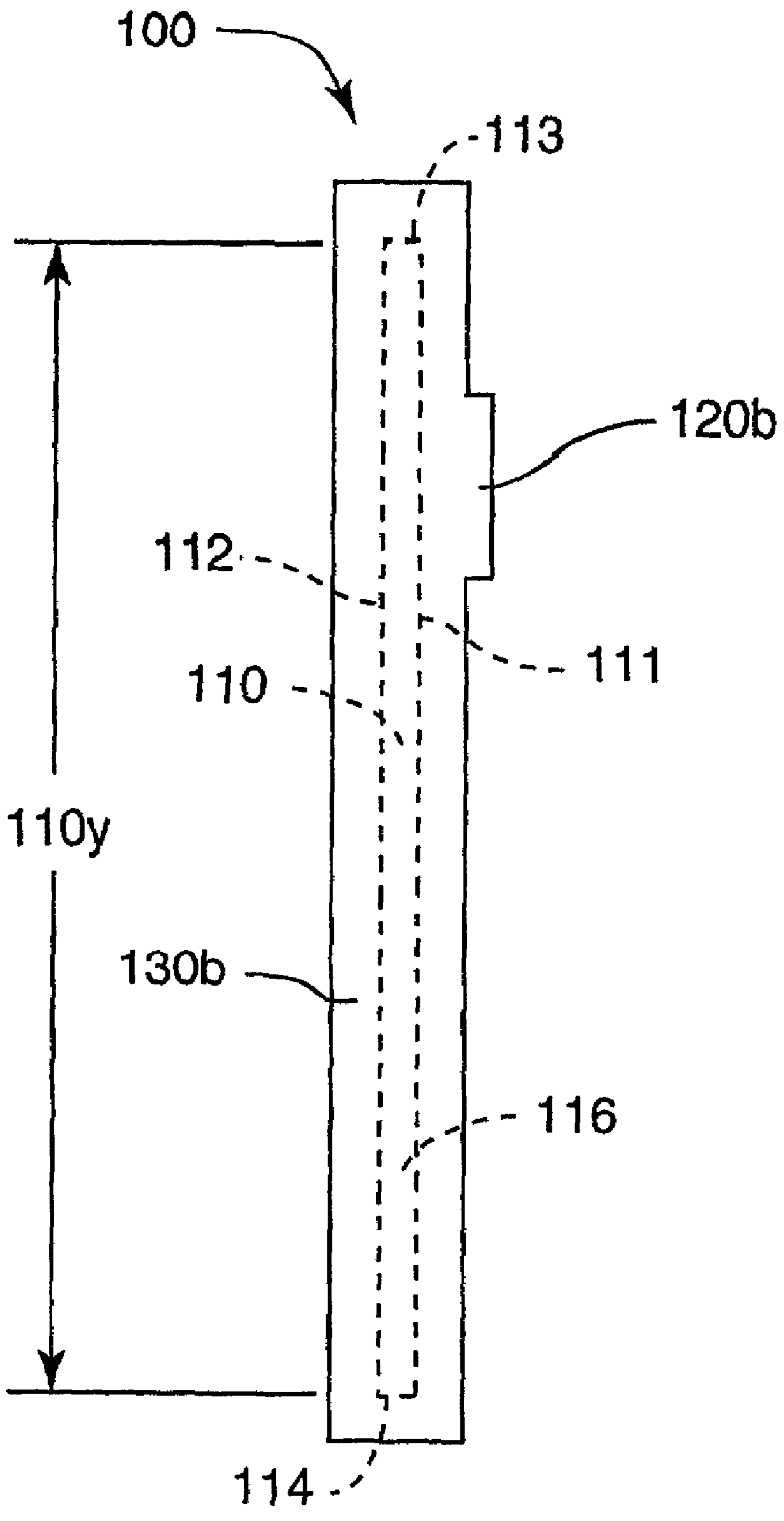
FIG. 12 is a side view of the dispenser shown in FIG. 11.

Referring generally to FIGS. 11 and 12, there is shown a first embodiment of a dispenser 100 according to the present invention. The dispenser 100 is effective for dispensing adhesive tape sheets 20 from a pad 10 of the tape sheets 20 as described herein and shown in FIGS. 1 through 3.

The dispenser 100 includes a base 110 and a pair of side tabs 120.

The base 110 has a first major surface 111, second major surface 112, a first longitudinal end 113, a second longitudinal end 114, a first lateral side 115, and a second lateral side 116. The first major surface 111 of the base 110 provides an area sized and shaped with a width 110*x* and a length 110*y* effective for accommodating a given tape sheet pad 10 (e.g., a dispenser 100 for use in dispensing 8 cm by 8 cm tape sheets 20 from a tape sheet pad 10 would have a first major surface 111 of about 8 to 10 cm long and 8 to 9 cm wide). Alternatively, in order to decrease the longitudinal length 110*y* of the dispenser 100, a tape sheet pad 10 can be folded over the second longitudinal end 114 of the base 110 with the tape sheet pad 10 adhered to both the first 111 and second 112 major surfaces of the base 110 (hereinafter referenced as the "folded alternative").

When the folded alternative is to be employed, the sidewalls 130 are preferably configured to transversely extend from both the first 111 and second 112 major surfaces of the base 110 a distance of from about 5 to 20 mm, and extend beyond the second 114 longitudinal end of the base 110 a distance of about 5 to 20 mm. In addition, the dispenser 100 is configured so that the central portion (unnumbered) of the second 114 longitudinal end of the base 110, preferably at least about 90% of the lateral width 110*x* of the base 110, is free of any transversely extending projections which might interfere with dispensing of the folded tape sheets 20.

The side tabs 120 are laterally opposed on opposite sides 115 and 116 of the base 110 proximate the first longitudinal end 113 of the base 110. Preferably the tabs 120 are longitudinally offset from the first longitudinal end 113 of the base 110 a distance of between about 5 to 20 mm so as to allow access to the corners of the pad 10 containing the areas of differential release should a dispensing failure occur. The tabs 120 are transversely spaced from the first major surface 111 of the base 110 with the first tab 120*a* laterally extending inward from the first side 115 of the base 110 and the second tab 120*b* laterally extending inward from the second side 116 of the base 110 so as to extend over the first major surface 111 of the base 110. The tabs 120 should longitudinally extend less than 50% of the length 110$y$ of the base 110, and more preferably extend less than 30% of the length 110$y$ of the base 110.

Other than the tabs 120, the first major surface 111 of the base 110 is exposed. This, in combination with the construction of tape sheets 20 having an area of differential release which extends less than the full length and width of the substrate 30, results in dispensing of tape sheets 20 from a pad 10 in a peel direction which is never parallel to the interior boundary (unnumbered) of the area of differential release between the intermediate tape sheet 25*i* and the underlying tape sheet 25*u*.

The tabs 120 are transversely spaced from the first major surface 111 of the base 110 a distance sufficient to accommodate placement of an edge portion (unnumbered) of the tape strip pad 10 to be dispensed from the dispenser 100 underneath each tab 120 yet close enough to the pad 10 to ensure that the area of differential release of an intermediate tape sheet 25*i* lifted during dispensing of an overlying tape sheet 25*o* will contact the associated tab 120 and remain separated from the underlying tape sheet 25*u* once the overlying tape sheet 25*o* is completely detached so as to facilitate subsequent dispensing of the intermediate tape sheet 25*i*. While the appropriate transverse spacing of the tabs 120 depends upon a number of variables including the number of tape sheets 20 in the tape sheet pad 10 intended to be dispensed from the dispenser 100, the lateral length of the tabs 120 and the size and shape of the area of differential release on the tape sheets 20 in the tape sheet pad 10 intended to be dispensed from the dispenser 100, generally a transverse distance of between about 5 to 20 mm will meet both requirements.

Similarly, the tabs 120 extend over the first major surface 111 of the base 110 a lateral distance sufficient to ensure that the area of differential release of an intermediate tape sheet 25*i* lifted during dispensing of an overlying tape sheet 25*o* will contact the associated tab 120 and remain separated from the underlying tape sheet 25*u* so as to facilitate subsequent dispensing of the intermediate tape sheet 25*i*, while minimizing the extent to which the tabs 120 interfere or obstruct dispensing of the overlying tape sheet 25*o* from the pad 10. While the most suitable lateral length of the tabs 120 depends upon a number of variables including the number of tape sheets 20 in the tape sheet pad 10 intended to be dispensed from the dispenser 100, the transverse spacing between the tabs 120 and the base 110, the size and shape of the area of differential release on the tape sheets 20 in the tape sheet pad 10 intended to be dispensed from the dispenser 100, and the width of the tape sheets 20 in the tape sheet pad 10 intended to be dispensed from the dispenser 100 relative to the width 110$x$ of the base 110, generally a lateral length of the tabs 120 of between about 5 to 30 mm will meet both requirements. Generally, each of the tabs 120 should extend over the base 110 a lateral distance of between about 10% to 30% of the width 110$x$ of the base 110.

The dispenser 100 may optionally include lateral sidewalls 130 running the longitudinal length 110$y$ of the base 110 and transversely extending upward from the first major surface 111 of the base 110 a distance of from about 5 to 20 mm. When sidewalls 130 are included, the tabs 120 may be conveniently attached to the top (unnumbered) of the sidewalls 130 with the first tab 120*a* extending from the first sidewall 130*a* and the second tab 120*b* extending from the second sidewall 130*b*.

Figure 13:
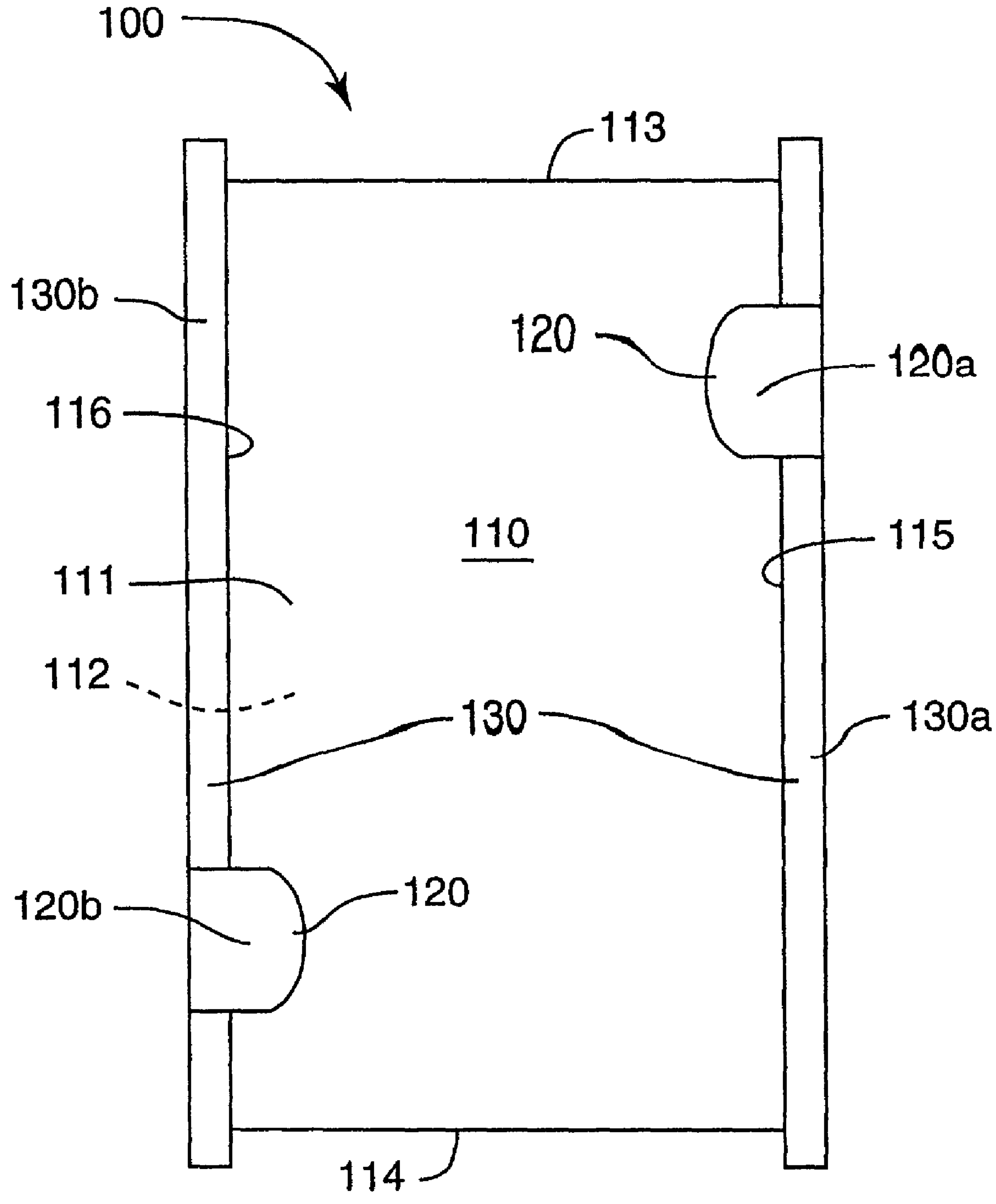
FIG. 13 is a top view of a second embodiment of a dispenser according to the present invention for the tape sheet pads shown in FIGS. 4 and 5.

A second embodiment of the dispenser 100 is shown in FIG. 13. The second embodiment of the dispenser 100 is effective for dispensing adhesive tape sheets 20 from a pad 10 of the tape sheets 20 as described herein and shown in FIGS. 4 and 5.

The second embodiment of the dispenser 100 is the same as the first embodiment described immediately above except that the side tabs 120 are laterally opposed on opposite sides 115 and 116 of the base 110 proximate different longitudinal ends 113 and 114 of the base 110.

The second embodiment of the dispenser 100 can be constructed and used in accordance with the folded alternative discussed above in connection with the first embodiment of the dispenser 100 by repositioning the tabs 120 so that the first tab 120*a* is transversely spaced from the first major surface 111 of the base 110 and the second tab 120*b* is transversely spaced from the second major surface 112 of the base 110.

Figure 14:
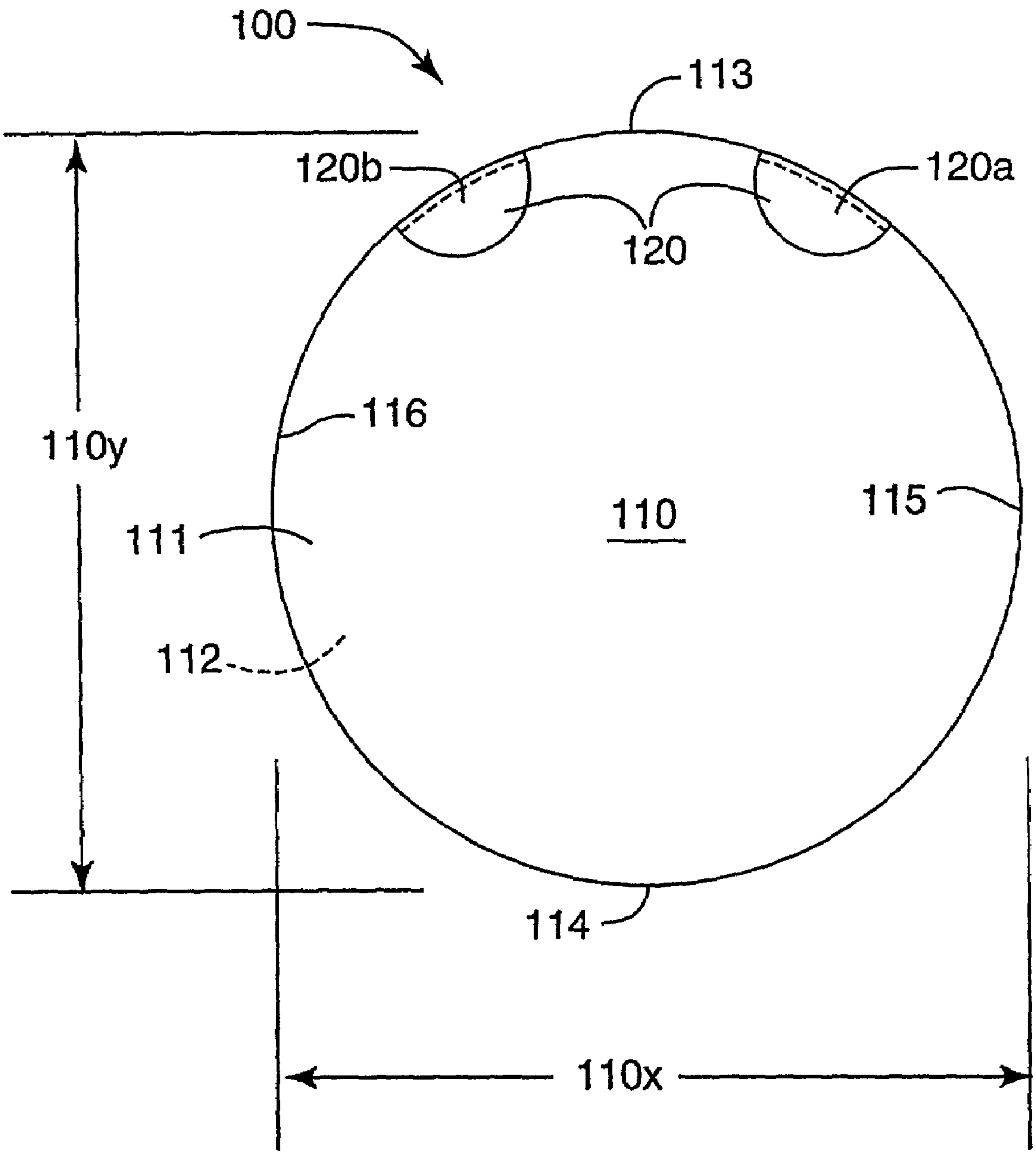
FIG. 14 is a top view of a third embodiment of a dispenser according to the present invention for the tape sheet pads shown in FIGS. 6 and 7.

A third embodiment of the dispenser 100 is shown in FIG. 14. The third embodiment of the dispenser 100 is effective for dispensing adhesive tape sheets 20 from a pad 10 of the tape sheets 20 as described herein and shown in FIGS. 6 and 7.

The third embodiment of the dispenser 100 is the same as the first embodiment of the dispenser 100 described above, except that the base 110 is round and the side tabs 120 are positioned within two adjacent quarter sectors (not shown) of the base 110.

The third embodiment of the dispenser 100 can be constructed and used in accordance with the folded alternative discussed above in connection with the first embodiment of the dispenser 100.

The dispenser 100 may be constructed from a variety of materials having the necessary structural integrity, including cardboard, fiberboard, metals, plastics, wood, and combinations thereof.

Figure 10:
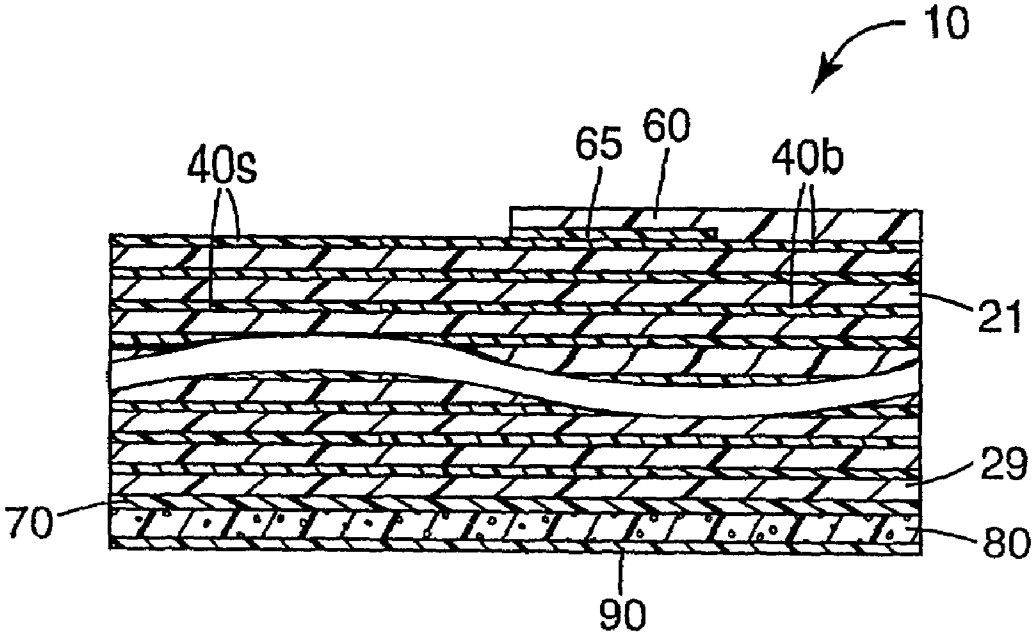
FIG. 10 is an enlarged end view of the tape sheet pad shown in FIG. 8*b* including a leader sheet.

As shown in FIG. 10, a length of double-faced adhesive tape 80 is provided between the backing 70 on the tape sheet pad 10 for securing the pad 10 into position on the first major surface 111 of the base 110 (i.e., the pad 10 does not detach from the base 110 during dispensing of individual tape sheets 20 from the pad 10). The exposed surface (unnumbered) of the double-faced adhesive tape 80 can be covered with a release liner 90 prior to attachment of the pad 10 to the base 110 of the dispenser 100.

The dispenser 100 permits the consistent dispensing of large individual tape sheets 20 from a tape sheet pad 10 over a wide range of peel angles $\alpha$, including peel angles $\alpha$ in excess of 90° and even in excess of 135°, a wide range of release forces for both the area of differential release and the area of basic release, and a wide range in the ratio of superior release force (SRP) to basic release force (BRF). While the ranges of these variables are interdependent, and dependent upon several other variables as well, including peel angle $\alpha$, release length, and elasticity of the substrate 30, a tape sheet pad 10 constructed within the general parameters set forth below in Table One can generally be dispensed with minimal failure (i.e., without multi-sheet dispensing and/or tail off) and with a consumer friendly release force when dispensed at peel angles $\alpha$ of greater than 90°. It is noted that an increase in either the SRF and/or the BRF (i.e., a "tighter" pad 10 of adhesive tape sheets 20) generally requires an increase in the ratio of SRF:BRF and/or a decrease in the release length in order to maintain the desired dispensability of the pad. It is also noted that the stiffness and caliper of the substrate 30 can also impact the SRF:BRF ratio capable of preventing tail off.

TABLE ONE

| RELEASE FORCE | | RATIO |
|---|---|---|
| Superior Release Area | Basic Release Area | BRF:SRF |
| 2-160 grams/inch | >100 grams/inch | ≧1.5:1 |

Use

Dispensing of Individual Tape Sheets

The dispensing of individual tape sheets 20 from the first embodiment of a stacked pad 10 of tape sheets 20, as shown in FIGS. 1 through 3 (i.e., areas of differential release located on alternating corners on the same longitudinal end of the sheets 20), retained within the dispenser 100 shown in FIGS. 11 and 12, is initiated by (i) lifting the nonadhesive tab 65 of the leader sheet 60, (ii) pulling the leader sheet 60 away from the pad 10 so as to cause the uppermost tape sheet 21 to release from the immediately adjacent tape sheet 20 in the area of differential release between the two tape sheets 20 with the leader sheet 60 still attached to the uppermost tape sheet 21 over a portion of the area of differential release between the uppermost tape sheet 21 and the immediately adjacent tape sheet 20, (iii) continuing to pull the leader sheet 60 so as to pull the released area of the uppermost tape sheet 21 towards the associated tab 120 on the dispenser 100 with a distal end portion (unnumbered) of the released area of the uppermost tape sheet 21 extending beyond the associated tab 120, and (iv) completing dispensing of the leader sheet 60 by pulling on the leader sheet 60 until the leader sheet 60 completely separates from the uppermost tape sheet 21, with the distal end portion of the released area of the uppermost tape sheet 21 contacting and resting upon the associated tab 120 so as to prevent the released area of the uppermost tape sheet 21 from returning to the pad 10.

Figure 3A:
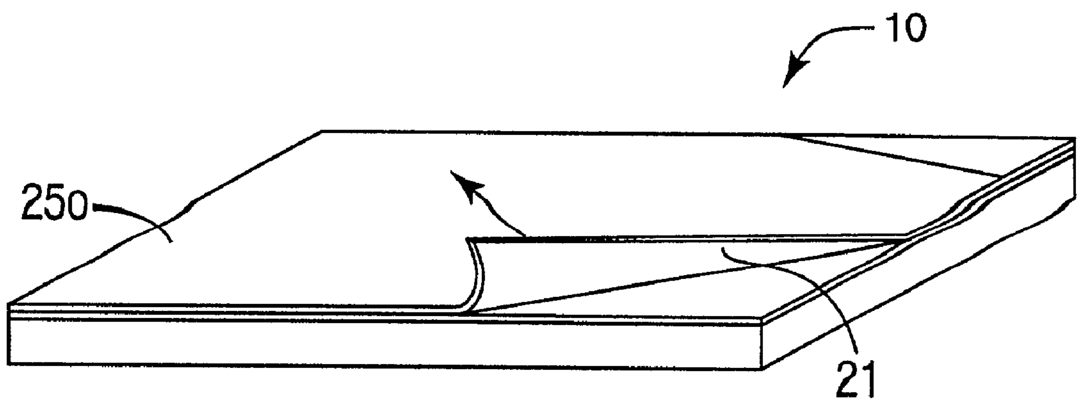
FIGS. 3*a-c* are perspective views of the tape sheet pad shown in FIG. 1 at various stages of dispensing.
Figure 3B:
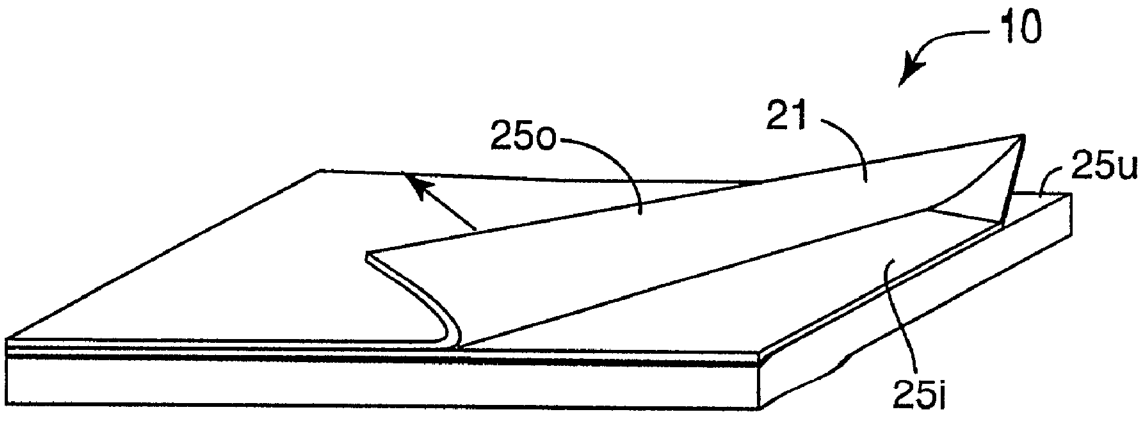
Figure 3C:
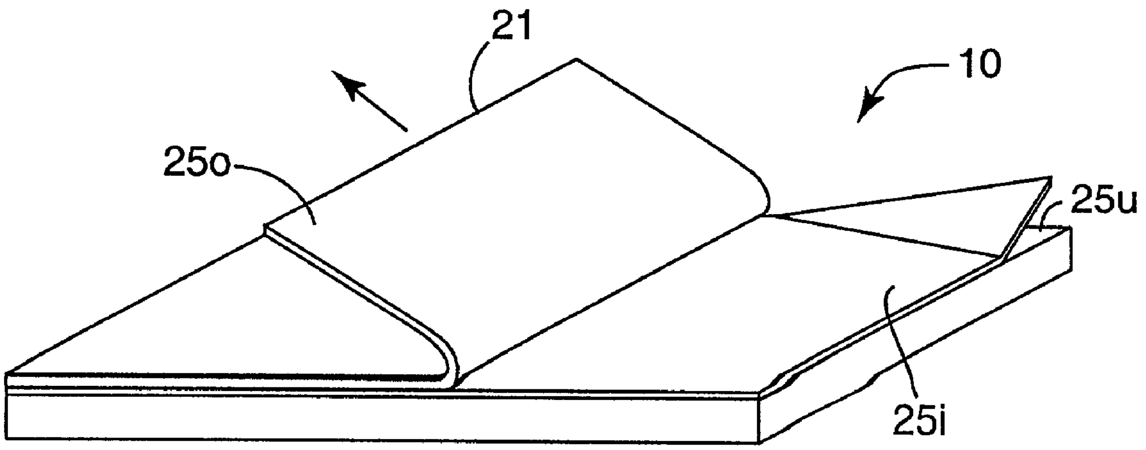

As shown in FIGS. 3*a-c*, subsequent tape sheets 20 can be individually dispensed from the pad 10 by repeating steps (ii) through (iv), wherein a dispensing set of an overlaying tape sheet 25*o*, intermediate tape sheet 25*i* and underlying tape sheet 25*u* are involved rather than a leader sheet 60, uppermost tape sheet 21 and adjacent tape sheet 20, respectively.

By configuring and arranging the areas of differential release to extend less than the entire length and width of the tape sheets 20, the intermediate tape sheet 25*i* can be lifted from the underlying tape sheet 25*u* in the area of differential release (i.e., area of lower adhesion level) between the intermediate tape sheet 25*i* and the underlying tape sheet 25*u* before the overlying tape sheet 25*o* is completely released from the intermediate tape sheet 25*i* in the area of higher adhesion level (i.e., the entire surface area minus the area of differential release) between the intermediate tape sheet 25*i* and the underlying tape sheet 25*u*.

The pad 10 and dispenser 100 are configured and arranged to permit peeling of the overlaying tape sheet 25*o* at a peel angle of greater than 90° and up to a peel angle of 180°. Such peel angles allow dispending of an overlaying tape sheet 25*o* at a decreased peel force relative to the peel force observed when peeling an overlaying tape sheet 25*o* at a peel angle of 90° or less, and permit a more natural dispensing of large tape sheets 20.

Configuration and arrangement of the pad 10 and dispenser 100 further facilitates dispensing and use of the tape sheets 20 by providing a consistent orientation of the tape sheets 20 relative to the dispenser 100 and allowing a user to readily observe and comprehend such orientation during dispensing of the overlying tape sheet 25*o*. This allows a user to innately know which side of the overlying tape sheet 25*o* is coated with adhesive 50 and thereby eliminates the prevailing practice observed with prior art tape strips of a user physically touching both sides of a dispensed tape strip in order to ascertain which side of the dispensed tape strip contains the adhesive.

Replacing Spent Tape Sheet Pad

A spent pad 10 can be replaced in the dispenser 100 by (i) peeling any remaining vestige of the spent pad 10 from the base 110 of the dispenser 100 (e.g., backing 70 and tape 80), (ii) removing the release liner 90 from the replacement pad 10, (iii) positioning the replacement pad 10 onto the base 110 of the dispenser 100 with the areas of differential release positioned under the tabs 120 and (iv) pressing the properly positioned replacement pad 10 into adhesive engagement with the base 110 of the dispenser 100.

Testing Protocols

Adhesion to Glass

Adhesion to glass is the force required to remove a coated flexible sheet material from a test panel of glass measured at a specific angle and rate of removal. This force is expressed in units force per width of coated sheet. The testing procedure is based upon ASTM D3330-78 and PSTC-1 in which (i) the adhesive tape sheet is applied to the horizontal surface of a clean glass test plate with at least 12.7 lineal cm of the sheet in firm contact with the glass plate using a 2.2 kg hard rubber roller to apply the sheet, (ii) the free end of the sheet is doubled back nearly touching itself so the angle of removal will be 180°, (iii) the free end of the sheet is attached to an adhesion tester scale, (iv) the glass test plate is clamped into the jaws of a tensile testing machine which is capable of moving the plate away from the scale, and (iv) the plate is moved away from the scale at a constant rate of 2.3 meters per minute.

We claim:

1. A stacked pad of adhesive tape sheets comprising a plurality of superimposed sheets wherein:

(a) the sheets include:

(i) a substrate having (A) first and second opposite major surfaces, (B) a longitudinal length, (C) a lateral width, and (D) an area of differential release defined relative to one of the first and second major surfaces and which extends less than the full length and width of the substrate, and (ii) a layer of an adhesive on the second major surface of the substrate, and (b) sequential sheets are configured and arranged with the area of differential release translocated to different corners of the sheets;

(c) the adhesive layer of each sheet is releasably adhered to an adjacent sheet at a first, higher adhesion level, except for the area of differential release which adheres to an adjacent sheet at a lower adhesion level;

(d) wherein the substrate has first and second opposing longitudinal ends, and further wherein the relative release forces of the first and second adhesion levels are configured for consistently causing a portion, but less than an entirety, of the first longitudinal end of an intermediate sheet to release and lift from an immediately underlying sheet as an immediately overlying sheet is completely peeled from the intermediate sheet;

(e) wherein the area of differential release is bounded by and outer perimeter, a shape of the perimeter defining a maximum width dimension in a direction corresponding with the lateral width of the substrate and a maximum length dimension in a direction corresponding with the longitudinal length of the substrate, and further wherein the maximum width dimension is less than the lateral width of the substrate.

2. The pad of claim 1 wherein sequential sheets are configured and arranged with the area of differential release alternating between first and second corners.

3. The pad of claim 2 wherein the first and second corners are diametrically opposed.

4. The pad of claim 2 wherein (i) the substrate has first and second opposite longitudinal ends, and (ii) the first and second corners are disposed along a common longitudinal end.

5. The pad of claim 2 wherein (i) the substrate has first and second opposite lateral sides, and (ii) the first and second corners are disposed along a common lateral side.

6. The pad of claim 1 having an uppermost sheet having an exposed first major surface and further comprising a leader sheet aligned with and superimposed over the exposed first major surface of the uppermost sheet with:

(a) a tacky portion of the leader sheet positioned over and adhesively bonded to the exposed first major surface of the uppermost sheet at an initiatory adhesion level, with (i) the tacky portion of the leader sheet in contact with at least a portion of that area of the uppermost sheet which is adhered to an immediately underlying sheet at the second adhesion level, and (ii) the initiatory adhesion level sufficiently greater than the second adhesion level that the area of the uppermost sheet which is adhered to an immediately underlying sheet at the second adhesion level releases from the immediately underlying sheet prior to complete release of the leader sheet from the uppermost sheet as the leader sheet is peeled from the pad; and (b) the leader sheet includes a nontacky corner portion, which forms a nontacky pull-tab.

7. The pad of claim 1 packaged for retail sale.

8. The pad of claim 1 wherein the ratio of the release force of the higher adhesion level and the release force of the lower adhesion level is at least 1.5:1.

9. The pad of claim 1 wherein the area of differential release is formed by a layer of low adhesion backsize on the first major surface of the substrate over the area of differential release.

10. The pad of claim 1 wherein the sheets further comprise a layer of a superior release low adhesion backsize on the first major surface of the substrate over the area of differential release and a layer of a basic low adhesion backsize on the first major surface of the substrate over the balance of the first major surface.

11. The pad of claim 1 wherein the sheets further comprise a layer of low adhesion backsize on the first major surface of the substrate wherein the low adhesion backsize is a coating of an ink receptive first low adhesion backsize over the area of differential release and a coating of an ink receptive second low adhesion backsize over the balance of the first major surface, wherein the first and second low adhesion backsizes have different release characteristics so as to be effective for contributing to the differential release forces between the area of differential release on each sheet and the balance of the area on each sheet.

12. The pad of claim 1 wherein the sheets further comprise a layer of low adhesion backsize on the first major surface of the substrate wherein the layer of low adhesion backsize is a continuous coating of low adhesion backsize over the area of differential release and a discontinuous coating of low adhesion backsize over the balance of the first major surface, wherein the areas having continuous and discontinuous coatings of low adhesion backsize have different release characteristics so as to be effective for contributing to the differential release forces between the area of differential release on each sheet and the balance of the area on each sheet.

13. The pad of claim 1 wherein the layer of adhesive is a coating of a first pressure sensitive adhesive on a portion of the second major surface to define the area of differential release and a coating of a second pressure sensitive adhesive over the balance of the second major surface, wherein the first and second pressure sensitive adhesives have different adhesion levels so as to be effective for contributing to the differential release forces between the area of differential release on each sheet and the balance of the second major surface.

14. The pad of claim 1 wherein the layer of adhesive is a discontinuous coating of a pressure sensitive adhesive on a portion of the second major surface to define the area of differential release and a continuous coating of a pressure sensitive adhesive over the balance of the second major surface, wherein the areas having continuous and discontinuous coatings of pressure sensitive adhesives have different adhesion levels so as to be effective for contributing to the differential release forces between the area of differential release on each sheet and the balance of the second major surface.

15. The pad of claim 1 wherein the area of differential release extends less than one-half the length and less than one-half the width of the substrate.

16. The pad of claim 15 wherein the area of differential release extends less than one-fourth the width of the substrate.

17. The pad of claim 1 wherein the substrate has first and second opposite longitudinal ends that combine to define the longitudinal length, and further wherein the area of differential release is not provided along any portion of at least one of the ends.

18. The pad of claim 1 wherein the substrate has first and second opposite lateral sides that combine to define the lateral width, and further wherein the area of differential release is not provided along any portion of at least one of the sides.

19. The pad of claim 1 wherein the maximum length dimension is less than the longitudinal length of the substrate.

20. The pad of claim 1 wherein an entirety of the area of differential release extends less than the full length and less than the full width of the substrate.

* * * * *

UNITED STATES PATENT AND TRADEMARK OFFICE

CERTIFICATE OF CORRECTION

PATENT NO. : 7,622,174 B2
APPLICATION NO. : 09/999698
DATED : November 24, 2009
INVENTOR(S) : Pearson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1943 days.

Signed and Sealed this

Twenty-sixth Day of October, 2010

David J. Kappos
*Director of the United States Patent and Trademark Office*

UNITED STATES PATENT AND TRADEMARK OFFICE

CERTIFICATE OF CORRECTION

PATENT NO. : 7,622,174 B2
APPLICATION NO. : 09/999698
DATED : November 24, 2009
INVENTOR(S) : Scott D. Pearson It is certified that error appears in the above-identified patent and that said Letters Patent is hereby corrected as shown below:

Column 16
Line 65, after “pad” insert -- 10 --.

Column 18
Line 39, in claim 1, after “adhesive” delete “tape”.

Line 49, in claim 1, after “substrate,” delete “and”.

Line 56, in claim 1, before “lower” insert -- second, --.

Line 66, in claim 1, delete “and” and insert -- an --.

Signed and Sealed this
Fourth Day of January, 2011

David J. Kappos
*Director of the United States Patent and Trademark Office*